United States Patent
Iwata

(10) Patent No.: US 11,853,222 B2
(45) Date of Patent: Dec. 26, 2023

(54) COMPUTER-READABLE RECORDING MEDIUM STORING DIVISION PROGRAM FOR DISTRIBUTING CACHE MEMORY TO APPLICATIONS AND DIVISION METHOD FOR DISTRIBUTING CACHE MEMORY TO APPLICATIONS

(71) Applicant: FUJITSU LIMITED, Kawasaki (JP)

(72) Inventor: Satoshi Iwata, Madison, WI (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/866,606

(22) Filed: Jul. 18, 2022

(65) Prior Publication Data

US 2023/0161706 A1    May 25, 2023

(30) Foreign Application Priority Data

Nov. 22, 2021  (JP) ................................. 2021-189516

(51) Int. Cl.
*G06F 12/0871* (2016.01)
*G06F 12/084* (2016.01)

(52) U.S. Cl.
CPC ........ *G06F 12/0871* (2013.01); *G06F 12/084* (2013.01); *G06F 2212/1021* (2013.01)

(58) Field of Classification Search
CPC ............... G06F 12/084; G06F 12/0871; G06F 2212/1021; Y02D 10/00
See application file for complete search history.

(56) References Cited

U.S. PATENT DOCUMENTS

| | | |
|---|---|---|
| 2009/0113404 A1 | 4/2009 | Takayama et al. |
| 2015/0339229 A1 | 11/2015 | Zhang et al. |
| 2020/0210334 A1* | 7/2020 | Sahin .................. G06F 12/0802 |

FOREIGN PATENT DOCUMENTS

| | | |
|---|---|---|
| JP | H08-147218 | 6/1996 |
| JP | 2009-104422 A | 5/2009 |
| JP | 2015-222477 A | 12/2015 |

OTHER PUBLICATIONS

Khang T. Nguyen, "Introduction to Cache Allocation Technology in the Intel Xeon Processor E5 v4 Family", 2016 Intel Corporation, Feb. 11, 2016 (Retrieved on Nov. 2, 2021) (Total 4 pages) [online] https://www.intel.com/content/www/us/en/developer/articles/technical/introduction-to-cache-allocation-technology.html.

Moinuddin K. Qureshi et al., "Utility-Based Cache Partitioning: A Low-Overhead, High-Performance, Runtime Mechanism to Partition Shared Caches", IEEE Computer Society, The 39th Annual IEEE/ACM International Symposium on Microarchitecture (MICRO'06), 2006 IEEE (Total 10 pages).

(Continued)

*Primary Examiner* — Larry T Mackall
(74) *Attorney, Agent, or Firm* — Fujitsu Patent Center

(57) ABSTRACT

A recording medium stores a division program for causing a computer to execute processing including: acquiring, for each application of a plurality of applications capable of sharing a cache memory, memory access information that enables specification of memory addresses accessed when each of the applications is operated in time series; calculating, for each of the applications, a frequency distribution of access intervals to the same memory address based on the acquired memory access information; specifying, for each of the applications, a correspondence relationship between a cache capacity and the number of cache hits to be allocated to each of the applications based on the calculated frequency distribution of the access intervals; and distributing, on based on the correspondence relationship specified for each of the applications, the cache memory to the plurality of applications such that a total number of cache hits of each of the applications is maximized.

6 Claims, 18 Drawing Sheets

(56) References Cited

OTHER PUBLICATIONS

Chen Ding et al., "Reuse Distance Analysis", Computer Science Department, University of Rochester, Technical Report UR-CS-TR-741, pp. 1-11, Feb. 2001 (Total 11 pages).

* cited by examiner

US 11,853,222 B2

COMPUTER-READABLE RECORDING MEDIUM STORING DIVISION PROGRAM FOR DISTRIBUTING CACHE MEMORY TO APPLICATIONS AND DIVISION METHOD FOR DISTRIBUTING CACHE MEMORY TO APPLICATIONS

CROSS-REFERENCE TO RELATED APPLICATION

This application is based upon and claims the benefit of priority of the prior Japanese Patent Application No. 2021-189516, filed on Nov. 22, 2021, the entire contents of which are incorporated herein by reference.

FIELD

The embodiment discussed herein is related to a division program and a division method.

BACKGROUND

Conventionally, in order to bridge a gap between a processing speed of a central processing unit (CPU) and an access speed of a main memory, a function called cache may be implemented in the CPU. In contrast to the main memory that mainly uses a dynamic random access memory (DRAM), a more expensive and faster static random access memory (SRAM) is often used for the CPU cache.

Japanese Laid-open Patent Publication No. 08-147218, Japanese Laid-open Patent Publication No. 2015-222477, and Japanese Laid-open Patent Publication No. 2009-104422 are disclosed as related art.

SUMMARY

According to an aspect of the embodiments, a non-transitory computer-readable recording medium stores a division program for causing a computer to execute processing including: acquiring, for each application of a plurality of applications capable of sharing a cache memory, memory access information that enables specification of memory addresses accessed when each of the applications is operated in time series; calculating, for each of the applications, a frequency distribution of access intervals to the same memory address on the basis of the acquired memory access information; specifying, for each of the applications, a correspondence relationship between a cache capacity and the number of cache hits to be allocated to each of the applications on the basis of the calculated frequency distribution of the access intervals; and distributing, on the basis of the correspondence relationship specified for each of the applications, the cache memory to the plurality of applications such that a total number of cache hits of each of the applications is maximized.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

As a prior art, there is a technology in which, in response to an access request, search processing is performed on a corresponding occupied area and shared area of a cache memory, and in response to a result thereof, replacement priority order of data in an area including the corresponding occupied area and shared area is operated, and in the case of a cache miss, data is replaced according to the replacement priority order given to the corresponding occupied area and shared area.

Furthermore, there is a technology in which, when first and second jobs are being executed, in response to designation of a program of the second job, a sector division ratio is calculated on the basis of a data access amount including a size and an access count of data accessed by the first and second jobs and a capacity of a shared cache memory, and the sector division ratio is changed to the calculated sector division ratio.

Furthermore, there is a technology in which, upon reception of a parallel code generation policy input by a user, processing of a code is divided, and a procedure for obtaining, while predicting an execution cycle from an operation amount and processing contents thereof, cache use of reuse data, and a main memory access data amount, a parallelization method with which the execution cycle becomes shortest is executed.

However, in the prior arts, it is difficult to efficiently use a cache memory shared by a plurality of applications. For example, there is a risk that the applications will compete with each other for a cache and cause remarkable performance deterioration.

In one aspect, it is an object of an embodiment to improve use efficiency of a cache memory shared by a plurality of applications.

Hereinafter, an embodiment of a division program and a division method will be described in detail with reference to the drawings.

Embodiment

Figure 1:
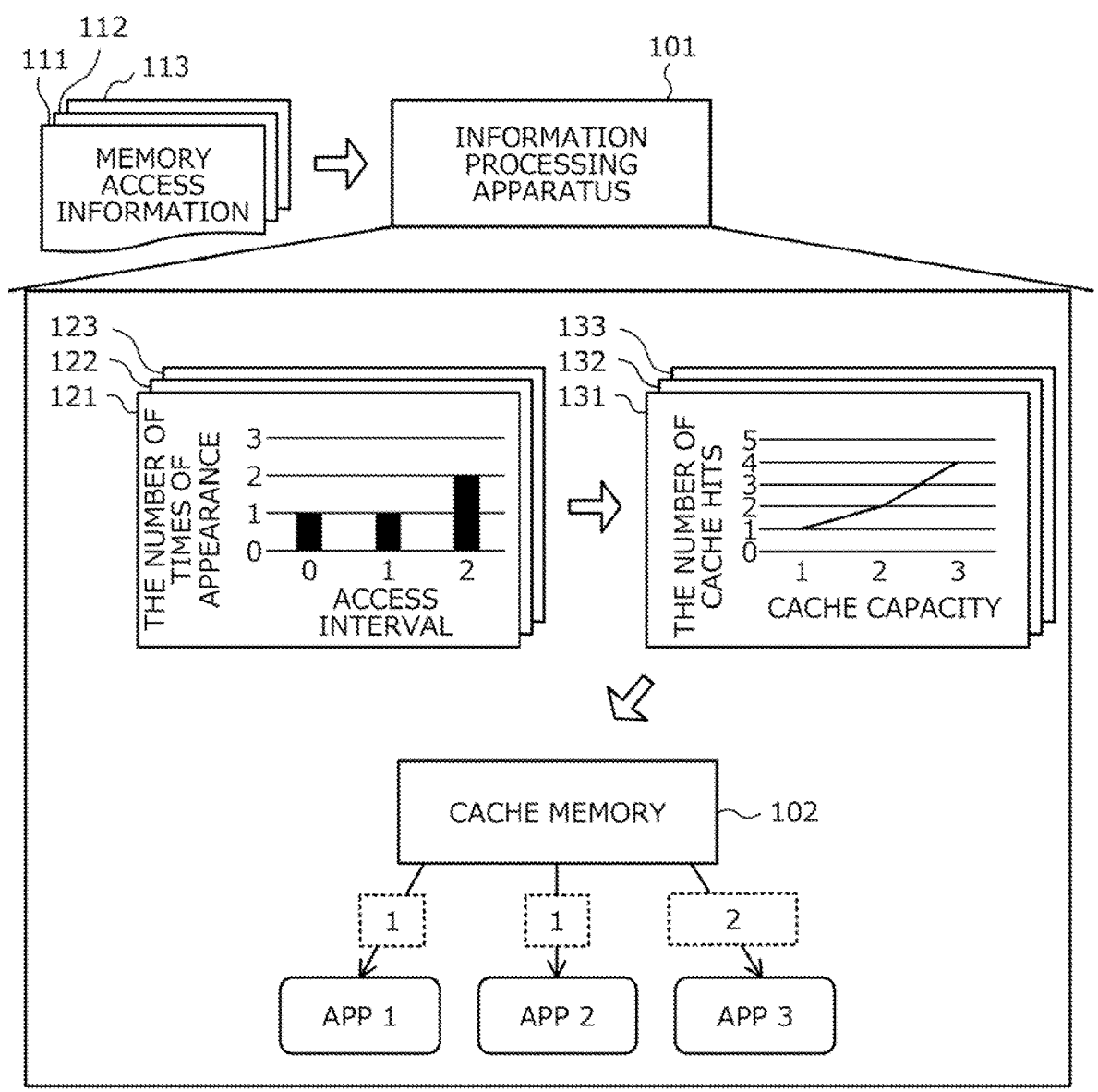
FIG. 1 is an explanatory diagram illustrating an example of a division method according to an embodiment.

FIG. 1 is an explanatory diagram illustrating an example of the division method according to the embodiment. In FIG. 1, an information processing apparatus 101 is a computer that distributes a cache memory to a plurality of applications. The cache memory is a storage device between a central processing unit (CPU) and a main memory (main storage device).

The cache memory may be mounted on a chip of the CPU or may be mounted outside the chip of the CPU. The cache memory is used as a temporary storage destination of data. By storing frequently accessed data in the cache memory, it is possible to reduce the number of times of access to the main storage device and increase a processing speed of the computer.

The cache memory may be layered, for example, and a primary cache, a secondary cache, and a tertiary cache may be implemented in the order that allows high-speed access. The primary cache and the secondary cache are often prepared for each core of the CPU. On the other hand, the tertiary cache is often shared and used among a plurality of cores.

An amount of frequently accessed data varies from program to program. Thus, by sharing a cache having a relatively large capacity among a plurality of programs, a program with a large number of pieces of frequently accessed data may use a cache having a large capacity while suppressing a cache allocation amount to a program with a small number of pieces of frequently accessed data.

However, sharing the tertiary cache between the cores has a disadvantage that programs may compete with each other for the cache and cause remarkable performance deterioration. For example, a case is assumed where the most common algorithm called least recently used (LRU), which leaves data having new time of last access in a cache, is used.

Here, when a certain program frequently and uniformly accesses an area larger than a cache size, a cache hit rate becomes almost zero because uniformly accessed data may not be fully stored in the cache. Examples of such a program include an application that performs video streaming.

Furthermore, not only does the cache hit rate of this program not increase, but also an area accessed by another program is expelled from the cache, and remarkable decrease in the cache hit rate occurs in all programs sharing the same tertiary cache. Here, description has been made by taking the LRU as an example, but since there is no universal cache replacement algorithm, such a problem may occur no matter what algorithm is used.

Thus, there is a technology (hereinafter referred to as "prior art 1") in which a tertiary cache is divided for each core and used, such as a cache allocation technology (CAT). For the prior art 1, for example, Khang T Nguyen, "Introduction to Cache Allocation Technology", [online], Feb. 11, 2016, [Retrieved on Nov. 2, 2021], the Internet <URL: https://www.intel.com/content/www/us/en/developer/articles/technical/introduction-to-cache-allocation-technology.html> may be referred to.

For example, it is assumed that the prior art 1 is used to allocate half of the tertiary cache to each of a core 1 and a core 2. In this case, when an application such as video streaming that deteriorates use efficiency of a cache is allocated to the core 1 and the other application is allocated to the core 2, the application operating on the core 2 may use 50% of the total cache without being affected by the video streaming. Moreover, when the entire tertiary cache is allocated to the core 2, the application operating on the core 2 may occupy the tertiary cache.

However, applications have a variety of access patterns to the memory. Here, a correspondence relationship between a cache capacity and a cache hit rate of an application will be described with reference to FIG. 2.

Figure 2:
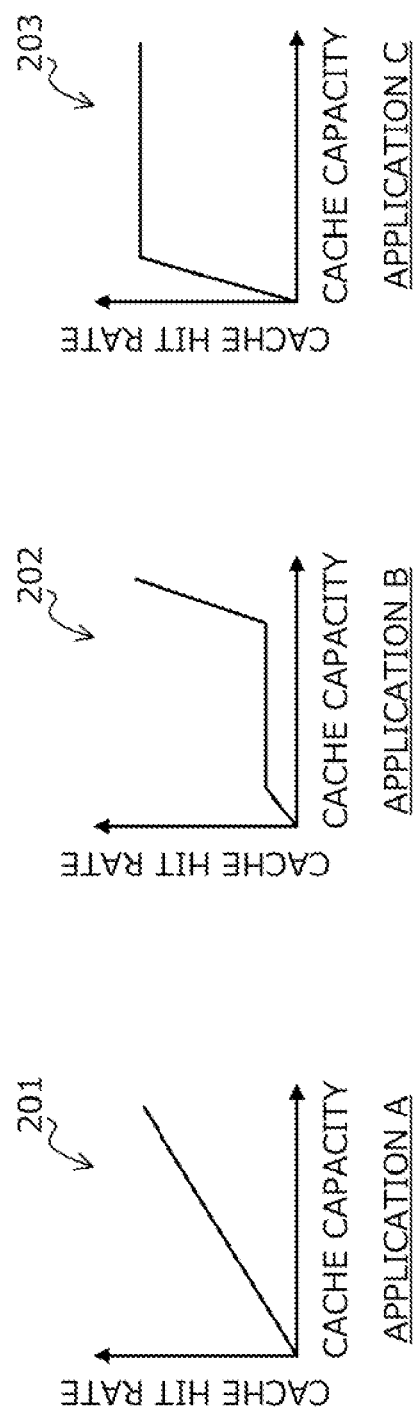
FIG. 2 is an explanatory diagram illustrating a correspondence relationship between a cache capacity and a cache hit rate.

FIG. 2 is an explanatory diagram illustrating the correspondence relationship between the cache capacity and the cache hit rate. In FIG. 2, a graph 201 indicates a correspondence relationship between a cache capacity and a cache hit rate of an application A. A graph 202 indicates a correspondence relationship between a cache capacity and a cache hit rate of an application B. A graph 203 indicates a correspondence relationship between a cache capacity and a cache hit rate of an application C.

According to the graph 201, for the application A, it may be seen that the cache hit rate increases as the cache capacity is increased. According to the graph 202, for the application B, it may be seen that a small cache capacity is insufficient and it is not possible to obtain a sufficient cache hit rate unless a large cache capacity is given. According to the graph 203, for the application C, it may be seen that a small cache capacity is sufficient and it is useless to allocate more cache capacity than is needed.

Thus, it is conceivable to determine, in consideration of an access pattern to the memory of each application, how much cache capacity is allocated to each application so that the number of cache hits may be most efficiently increased.

For example, there is a technology (hereinafter referred to as "prior art 2") in which a mechanism to monitor a cache access pattern is implemented in hardware and cache allocation is dynamically changed. For the prior art 2, for example, Moinuddin K. Qureshi Yale N. Patt, Utility-Based Cache Partitioning: A Low-Overhead, High-Performance, Runtime Mechanism to Partition Shared Caches, The 39th Annual IEEE/ACM International Symposium on Microarchitecture (MICRO '06), 2006 may be referred to.

In the prior art 2, a cache access pattern during execution of a program is monitored, and a cache hit rate according to the number of cache ways is calculated. For example, as a result of monitoring the access pattern to the cache, it is assumed that, in a certain application being executed, a cache hit rate is estimated to be "30%" in a case where a cache size is 1 way, "(30+20)%" in a case where the cache size is 2 ways, "(30+20+15)%" in a case where the cache size is 3 ways, and "(30+20+15+10)%" in a case where the cache size is 4 ways. 1 way corresponds to, for example, a cache capacity that is an integer multiple of a cache line. In the prior art 2, the cache hit rate is estimated by each of two applications, and the number of cache ways that maximizes a total cache hit rate is obtained.

However, the prior art 2 needs implementation in hardware to capture cache access in real time and analyze an access pattern. The implementation in hardware is expensive, and there are high hurdles to actually use the implementation in hardware. Furthermore, although the prior art 2 assumes a dual-core environment, currently, a CPU with several tens of cores may be used, and a method that may be used only in the dual-core environment is insufficient. In the prior art 2, since analysis of a cache access pattern is performed in real time, it is conceivable that the number of applicable cores is limited due to a problem of an amount of calculation and a problem of an amount of data.

Thus, in the embodiment, a division method for improving use efficiency of a cache memory shared by a plurality of applications will be described. Hereinafter, processing examples ((1) to (3) below) of the information processing apparatus 101 will be described. Here, a cache memory shared by a plurality of applications is referred to as "cache memory 102".

(1) The information processing apparatus 101 acquires memory access information of each application of a plurality of applications sharing the cache memory 102. Here, the memory access information is information that may specify, in time series, memory addresses accessed when each application is operated.

In the example of FIG. 1, a case is assumed where the plurality of applications is "applications 1 to 3" and memory access information 111 to 113 of the applications 1 to 3 are acquired. For example, the memory access information 111 is information that may specify, in time series, memory addresses accessed when the application 1 is operated.

(2) For the applications 1 to 3 ("apps 1 to 3" in FIG. 1), the information processing apparatus 101 calculates a frequency distribution of access intervals to the same memory address on the basis of the acquired memory access information 111 to 113. Here, in a case where the LRU is used as the cache replacement algorithm, depending on the number of other memory areas accessed from when a certain memory area is accessed to when the same area is accessed again, it is determined whether (data of) the area remains in the cache.

For example, in a case where a cache capacity is equivalent to one cache line, when another memory area is accessed even once from when a memory area A is accessed once to when the memory area A is accessed again, the memory area A is expelled from the cache. The cache line represents a unit of a size of data stored in the cache.

Furthermore, for example, in a case where the cache capacity is equivalent to two cache lines, when only another one memory area is accessed from when the memory area A is accessed once to when the memory area A is accessed again, the memory area A is not expelled from the cache. On the other hand, when there are two or more other memory areas accessed, the memory area A is expelled from the cache.

In this way, it may be said that a cache hit rate according to a cache capacity changes depending on an interval at which an application accesses the same memory area. Furthermore, it may also be said that the cache hit rate according to the cache capacity changes depending on a frequency of occurrence of access to the same memory area at a certain interval.

Thus, for the applications 1 to 3, the information processing apparatus 101 calculates, for example, an access interval to the same memory address on the basis of the acquired memory access information 111 to 113. The access interval to the same memory address is represented by, for example, the number of other memory addresses accessed before access to the same memory address occurs.

Then, for each of the applications 1 to 3, the information processing apparatus 101 calculates, for example, a frequency distribution of the access intervals to the same memory address by totaling the calculated access intervals. The frequency distribution of the access intervals is obtained by arranging frequencies of appearance of the same value in the calculated access intervals. Here, a case is assumed where histograms 121 to 123 representing the frequency distribution of the access intervals are created.

The histograms 121 to 123 indicate a correspondence relationship between an access interval to the same memory address and the number of times of appearance of the applications 1 to 3, respectively. For example, the histogram 121 indicates, for the application 1, the number of times of appearance "1" with the access interval "0", the number of times of appearance "1" with the access interval "1", and the number of times of appearance "2" with the access interval "2".

(3) The information processing apparatus 101 distributes the cache memory 102 to the applications 1 to 3 on the basis of the frequency distribution of the access intervals calculated for each of the applications 1 to 3. For example, for each of the applications 1 to 3, the information processing apparatus 101 specifies, on the basis of the calculated frequency distribution of the access intervals, a correspondence relationship between a cache capacity and the number of cache hits to be allocated to each of the applications 1 to 3.

In more detailed description, for example, for the applications 1 to 3, the information processing apparatus 101 specifies the correspondence relationship between the cache capacity and the number of cache hits by integrating the histograms 121 to 123. Graphs 131 to 133 represent the correspondence relationship between the cache capacity and the number of cache hits to be allocated to the applications 1 to 3.

For example, the graph 131 indicates, for the application 1, the number of cache hits "1" when the cache capacity is "1", the number of cache hits "2" when the cache capacity is "2", and the number of cache hits "4" when the cache capacity is "3". Note that a unit of the cache capacity is a predetermined allocation unit (for example, an integer multiple of 64 bytes).

Then, on the basis of the graphs 131 to 133 (correspondence relationship between the cache capacity and the number of cache hits to be allocated to each of the applications 1 to 3), the information processing apparatus 101 distributes the cache memory 102 to the applications 1 to 3 so that the total number of cache hits of each of the applications 1 to 3 is maximized.

In more detailed description, for example, the information processing apparatus 101 determines a division ratio of the cache memory 102 for the applications 1 to 3 so that the total number of cache hits of each of the applications 1 to 3 is maximized. Then, the information processing apparatus 101 divides the cache memory 102 according to the determined division ratio, and allocates the cache memory 102 to each of the applications 1 to 3.

Here, it is assumed that the division ratio "1:1:2" of the cache memory 102 for the applications 1 to 3 is determined. In this case, the cache memory 102 is divided according to the division ratio "1:1:2" and allocated to each of the applications 1 to 3. For example, a quarter of the cache capacity of the entire cache memory 102 is allocated to the application 1. A quarter of the cache capacity of the entire cache memory 102 is allocated to the application 2. A half of the cache capacity of the entire cache memory 102 is allocated to the application 3.

In this way, according to the information processing apparatus 101, the cache memory 102 may be distributed to the applications 1 to 3 according to the memory access patterns of the applications 1 to 3. For example, in consideration of an interval at which each of the applications 1 to 3 accesses the same memory area and a frequency of occurrence of the access interval, the information processing apparatus 101 may distribute the cache memory 102 to the applications 1 to 3 so as to increase a cache hit rate of the entire applications 1 to 3. For example, the information processing apparatus 101 may match the graphs 131 to 133 between the applications and distribute the cache memory 102 to the applications 1 to 3 so as to maximize the number of cache hits of the entire applications 1 to 3. With this configuration, use efficiency of the cache memory 102 shared by the applications 1 to 3 may be improved.

(System Configuration Example of Information Processing System 300)

Next, a system configuration example of an information processing system 300 including the information processing apparatus 101 illustrated in FIG. 1 will be described. Here, description will be made by taking, as an example, a case where the information processing apparatus 101 illustrated in FIG. 1 is applied to a cache division device 301 in the information processing system 300. The information processing system 300 is applied to, for example, a computer system using high-performance computing (HPC).

Figure 3:
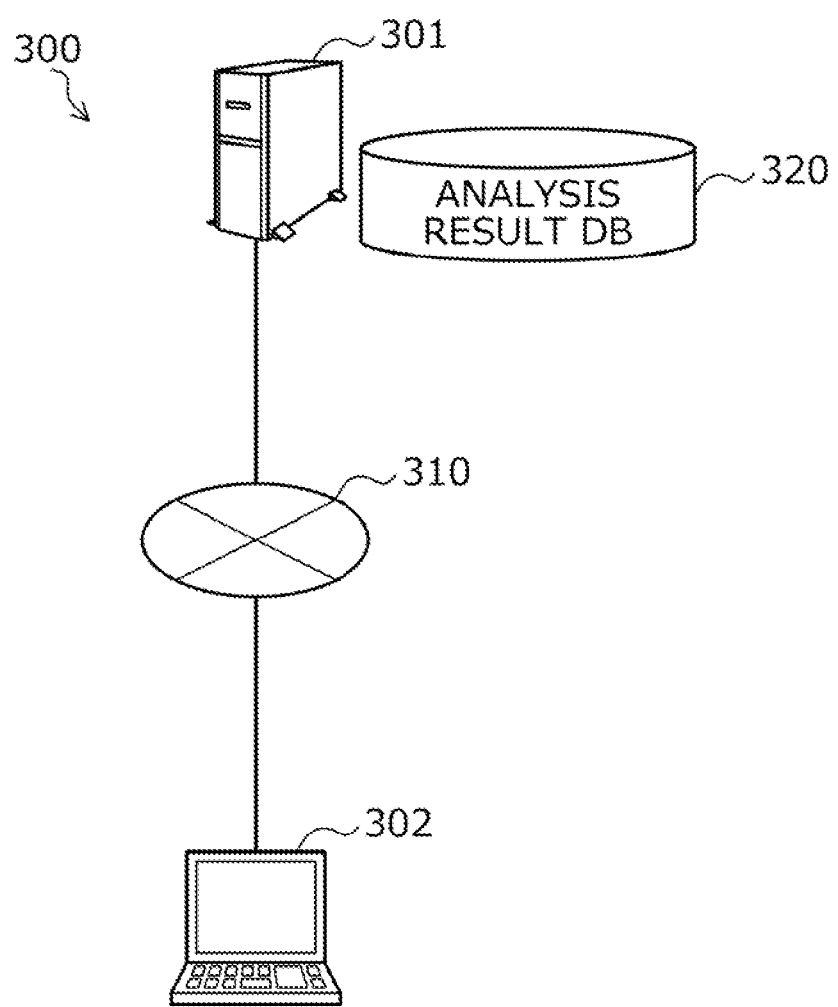
FIG. 3 is an explanatory diagram illustrating a system configuration example of an information processing system 300.

FIG. 3 is an explanatory diagram illustrating the system configuration example of the information processing system 300. In FIG. 3, the information processing system 300 includes the cache division device 301 and a client device 302. In the information processing system 300, the cache division device 301 and the client device 302 are connected via a wired or wireless network 310. The network 310 is, for example, the Internet, a local area network (LAN), or a wide area network (WAN).

Here, the cache division device 301 is a computer including an analysis result database (DB) 320 and capable of executing a plurality of applications. Furthermore, the cache division device 301 distributes a cache memory to a plurality of applications. The cache memory is, for example, a cache memory CM (CPU cache) illustrated in FIG. 4 described later.

In the following description, a plurality of applications that may share a cache memory may be referred to as "applications #1 to #n" (n: a natural number of 2 or more), and an optional application from the applications #1 to #n may be referred to as "application #i" (i=1, 2, . . . , n).

The application #i is, for example, software that performs various simulations of weather, earth, air, waves, materials, and the like. The cache division device 301 is, for example, a server such as a supercomputer or a high performance computer. Note that storage content of the analysis result DB 320 will be described later with reference to FIG. 5.

The client device 302 is a computer used by a user of the information processing system 300. The user is, for example, a researcher or a developer who performs various simulations. Examples of the client device 302 include a personal computer (PC) or a tablet PC.

In the information processing system 300, a user may designate, by using the client device 302, the application #i to be executed in the cache division device 301. The designation of the application #i is performed by, for example, designation of an identifier (ID) that uniquely identifies the application #i.

Note that, here, the cache division device 301 and the client device 302 are separately provided. However, the present embodiment is not limited to this. For example, the cache division device 301 may be implemented by the client device 302. Furthermore, the information processing system 300 may include a plurality of the client devices 302. Furthermore, the applications #1 to #n may be executed on another computer different from the cache division device 301. In this case, for example, the cache division device 301 may be controlled to distribute a cache memory of the another computer to the applications #1 to #n executed on the another computer.

(Hardware Configuration Example of Cache Division Device 301)

Next, a hardware configuration example of the cache division device 301 will be described.

Figure 4:
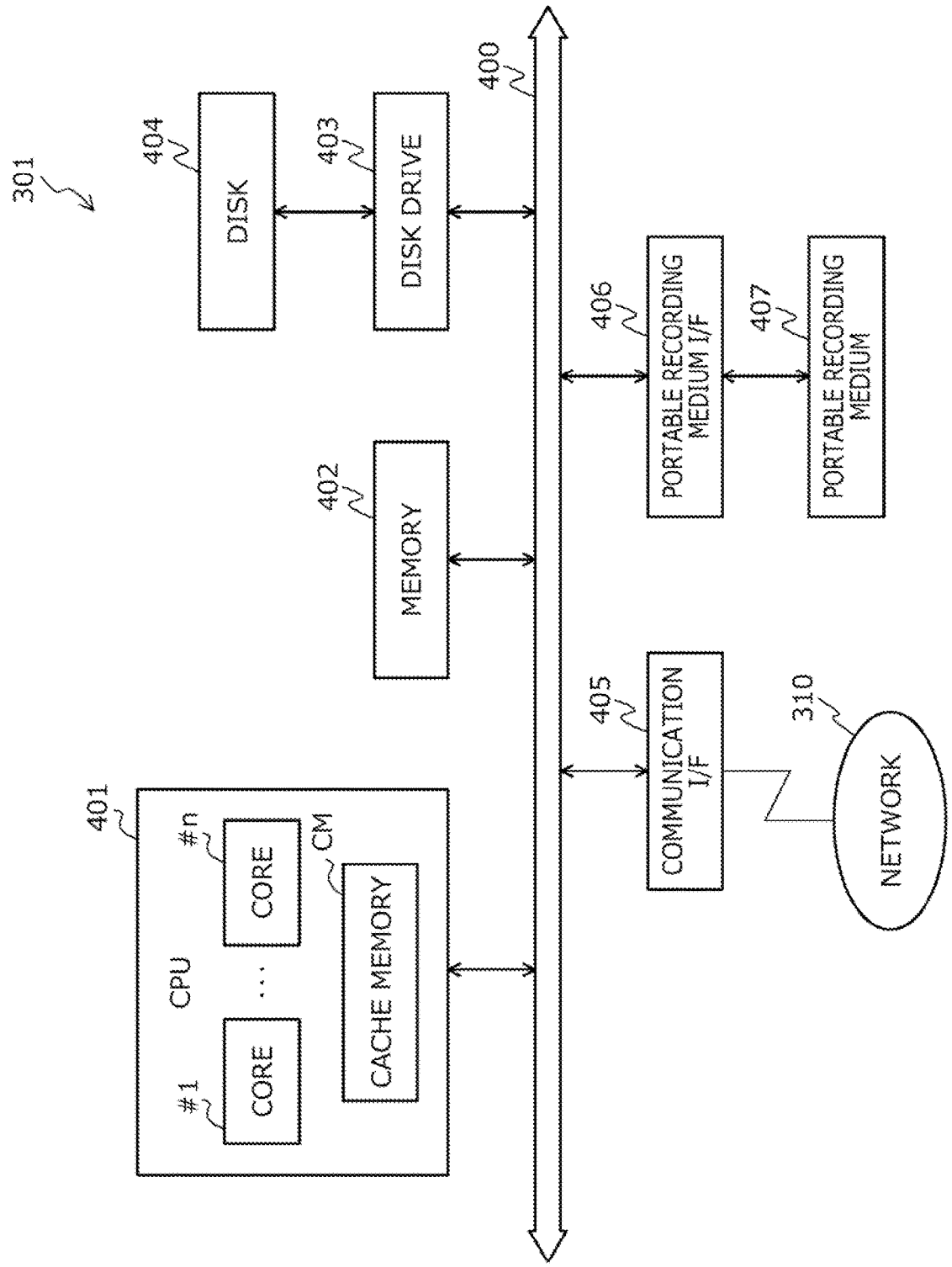
FIG. 4 is a block diagram illustrating a hardware configuration example of a cache division device 301.

FIG. 4 is a block diagram illustrating the hardware configuration example of the cache division device 301. In FIG. 4, the cache division device 301 includes a CPU 401, a memory 402, a disk drive 403, a disk 404, a communication interface (I/F) 405, a portable recording medium I/F 406, and a portable recording medium 407. Furthermore, the respective components are connected to each other by a bus 400.

Here, the CPU 401 is responsible for overall control of the cache division device 301. The CPU 401 includes cores #1 to #n and the cache memory CM. Each core #i is an operation circuit inside the CPU 401 (i=1, 2, . . . , n). The cache memory CM is a storage device between the CPU 401 and the memory 402, and is used as a temporary storage destination of data. The cache memory CM corresponds to, for example, a cache memory (tertiary cache) shared between the cores #1 to #n.

The memory 402 includes, for example, a read only memory (ROM), a random access memory (RAM), and a flash ROM. For example, the flash ROM stores an operating system (OS) program, the ROM stores application programs, and the RAM is used as a work area for the CPU 401. The programs stored in the memory 402 are loaded into the CPU 401 to cause the CPU 401 to execute coded processing.

The disk drive 403 controls reading/writing of data from/to the disk 404 under the control of the CPU 401. The disk 404 stores data written under the control of the disk drive 403. Examples of the disk 404 include a magnetic disk or an optical disk.

The communication I/F 405 is connected to the network 310 through a communication line, and is connected to an external computer (for example, the client device 302 illustrated in FIG. 3) via the network 310. Then, the communication I/F 405 manages an interface between the network 310 and the inside of the device, and controls input and output of data from the external computer. For example, a modem, a LAN adapter, or the like may be adopted as the communication I/F 405.

The portable recording medium I/F 406 controls reading/writing of data from/to the portable recording medium 407 under the control of the CPU 401. The portable recording medium 407 stores data written under the control of the portable recording medium I/F 406. Examples of the portable recording medium 407 include a compact disc (CD)-ROM, a digital versatile disk (DVD), and a universal serial bus (USB) memory.

Note that the cache division device 301 may include, for example, an input device and a display in addition to the components described above. Furthermore, the cache division device 301 does not have to include, for example, the portable recording medium I/F 406 and the portable recording medium 407 among the components described above. Furthermore, here, the cache memory CM is provided on a chip of the CPU 401. However, the cache memory CM may be provided outside the chip of the CPU 401. Furthermore, the client device 302 illustrated in FIG. 3 may also be implemented by a hardware configuration similar to that of the cache division device 301. Note that the client device 302 includes, for example, an input device and a display in addition to the components described above.

(Storage Content of Analysis Result DB 320)

Next, storage content of the analysis result DB 320 included in the cache division device 301 will be described with reference to FIG. 5. The analysis result DB 320 is implemented by, for example, a storage device such as the memory 402 or the disk 404.

Figure 5:
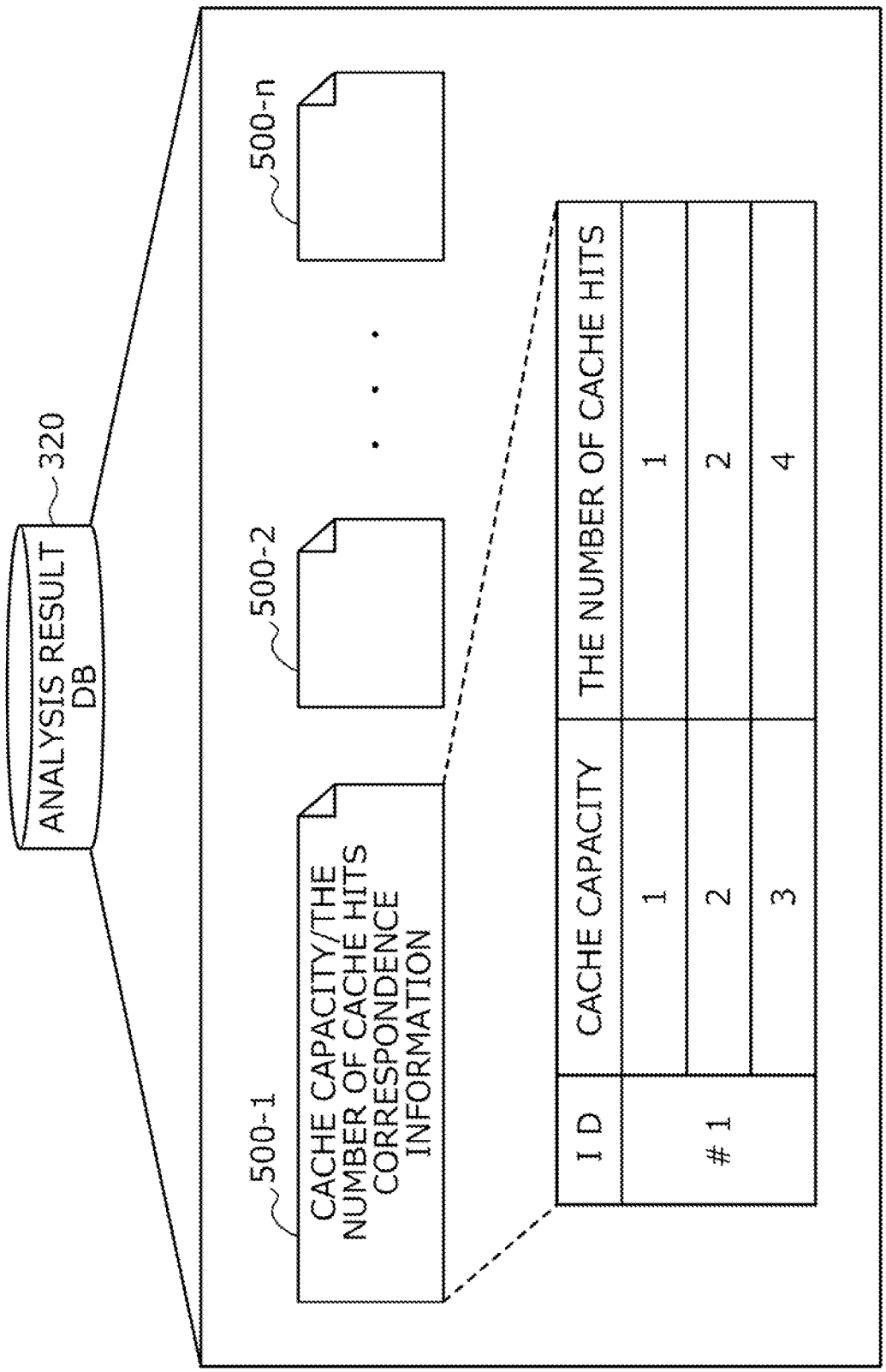
FIG. 5 is an explanatory diagram illustrating an example of storage content of an analysis result database (DB) 320.

FIG. 5 is an explanatory diagram illustrating an example of the storage content of the analysis result DB 320. In FIG. 5, the analysis result DB 320 stores cache capacity/the number of cache hits correspondence information 500-1 to 500-*n* of the applications #1 to #n. The cache capacity/the number of cache hits correspondence information 500-1 to 500-*n* indicates a correspondence relationship between a cache capacity and the number of cache hits for the applications #1 to #n.

For example, the cache capacity/the number of cache hits correspondence information 500-1 indicates a correspondence relationship between a cache capacity and the number of cache hits for the application #1 (ID: 1). The unit of the cache capacity is an allocation unit of a cache capacity to be allocated to the application #i (core #i). The allocation unit is, for example, an integer multiple of 64 bytes.

(Functional Configuration Example of Cache Division Device 301)

Figure 6:
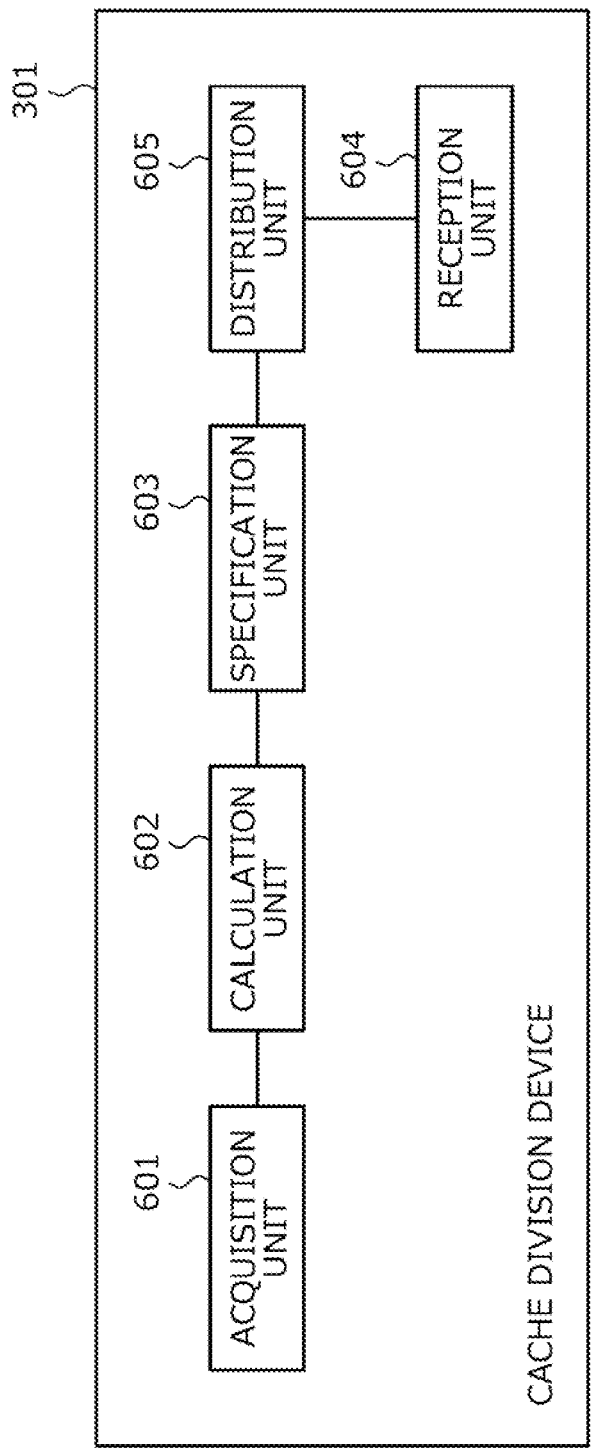
FIG. 6 is a block diagram illustrating a functional configuration example of the cache division device 301.

FIG. 6 is a block diagram illustrating a functional configuration example of the cache division device 301. In FIG. 6, the cache division device 301 includes an acquisition unit 601, a calculation unit 602, a specification unit 603, a reception unit 604, and a distribution unit 605. The acquisition unit 601 to the distribution unit 605 have functions serving as a control unit, and for example, these functions are implemented by causing the CPU 401 to execute a program stored in a storage device such as the memory 402, the disk 404, or the portable recording medium 407 illustrated in FIG. 4, or by the communication I/F 405. A processing result of each functional unit is stored in, for example, a storage device such as the memory 402 or the disk 404.

The acquisition unit 601 acquires memory access information for each application #i of the applications #1 to #n. The memory access information is information that may specify, in time series, memory addresses accessed when the application #i is operated. The memory address is an address of the memory 402 illustrated in FIG. 4.

Here, a specific example of the memory access information will be described with reference to FIG. 7.

Figure 7:
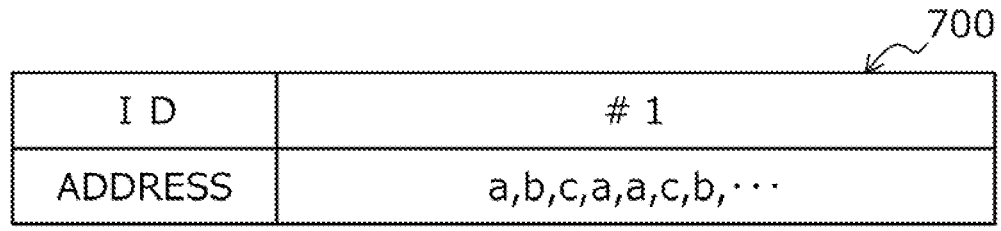
FIG. 7 is an explanatory diagram illustrating a specific example of memory access information.

FIG. 7 is an explanatory diagram illustrating the specific example of the memory access information. In FIG. 7, memory access information 700 includes an ID and an address. The ID is an identifier that uniquely identifies the application #i. The address is obtained by arranging, in time series, memory addresses accessed when the application #i is operated.

According to the memory access information 700, memory addresses "a, b, c, a, a, c, b, . . . " accessed by the application #1 when the application #1 is operated may be specified in time series. Note that a, b, and c indicate memory addresses different from each other.

Figure 8:
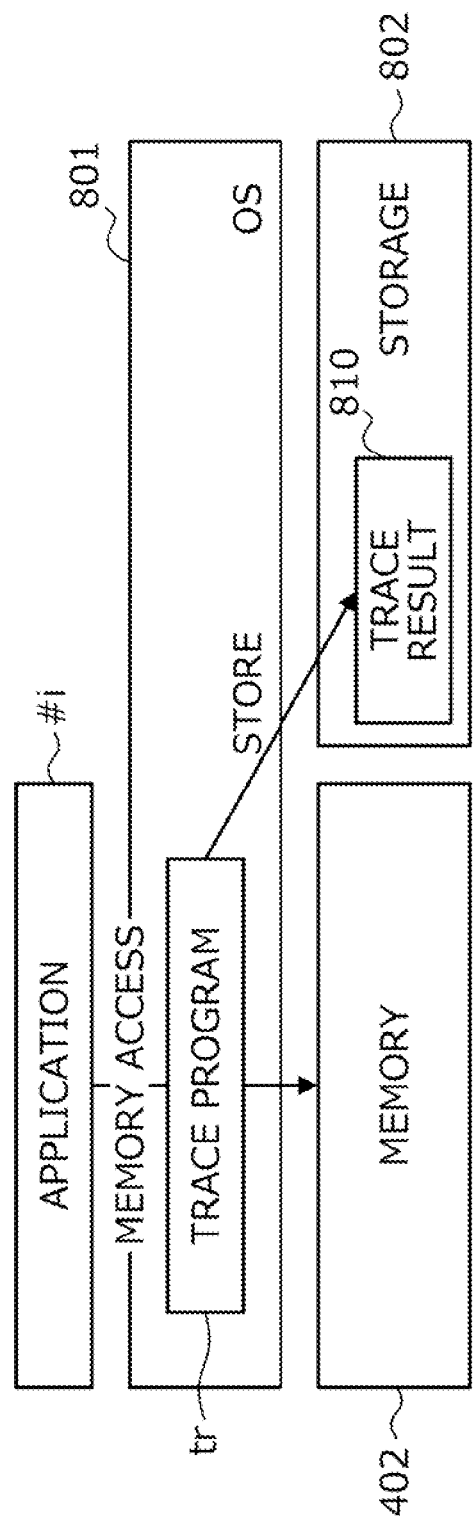
FIG. 8 is an explanatory diagram illustrating an operation example of a trace program tr.

For example, the acquisition unit 601 acquires the memory access information 700 from a trace program tr as illustrated in FIG. 8 described later. The trace program tr is a program that operates on an OS, and acquires a trace of memory access. Note that an operation example of the trace program tr will be described later with reference to FIG. 8.

Returning to the description of FIG. 6, for each application #i, the calculation unit 602 calculates a frequency distribution of access intervals to the same memory address on the basis of acquired memory access information. For example, for each application #i, the calculation unit 602 calculates a reuse distance (rd) on the basis of the acquired memory access information.

Here, rd is an index value representing an access interval to the same memory address in a reuse distance technology, and corresponds to the number of other memory addresses accessed before access to the same memory address occurs. The reuse distance technology is a method for recording an access history to a memory when a program is executed and analyzing an access interval to the same area.

Note that a calculation example of rd will be described later with reference to FIG. 9. Furthermore, for the reuse distance technology, for example, Chen Ding Yutao Zhong, Reuse Distance Analysis, Computer Science Department, University of Rochester, Technical Report UR-CS-TR-741, February 2001 may be referred to.

Then, the calculation unit 602 calculates a frequency distribution of the calculated rd for each application #i. The frequency distribution of rd is obtained by arranging frequencies of appearance of rd with the same value in the calculated calculation results (rd). In more detailed description, for example, the calculation unit 602 creates a histogram representing the calculated frequency distribution of rd for each application #i.

Note that a specific example of the histogram representing the frequency distribution of rd will be described later with reference to FIG. 10.

The specification unit 603 specifies, for each application #i, a correspondence relationship between a cache capacity and the number of cache hits to be allocated to each application #i on the basis of a calculated frequency distribution of rd. For example, for each application #i, the specification unit 603 specifies the correspondence relationship between the cache capacity and the number of cache hits to be allocated to each application #i by integrating a created histogram.

In more detailed description, for example, the specification unit 603 may specify the correspondence relationship between the cache capacity and the number of cache hits to be allocated to each application #i by using the following Expression (1). Note that f(m) is the number of cache hits when the cache capacity is m. $a_k$ is the number of times of appearance when rd is "rd=k".

[Expression 1]

$$f(m) = \sum_{k=0}^{m-1} a_k \qquad (1)$$

According to Expression (1) described above, the number of cache hits when the cache capacity m is allocated to the application #i may be specified. The specified specification result is stored, for example, in the analysis result DB 320 illustrated in FIG. 5 as cache capacity/the number of cache hits correspondence information. Note that a specification example of the correspondence relationship between the cache capacity and the number of cache hits to be allocated to the application #i will be described later with reference to FIG. 11.

The reception unit 604 receives designation of an object application. Here, the object application is an application that starts operation, and is, for example, any one of the applications #1 to #n. For example, by receiving an execution request of the object application from the client device 302 illustrated in FIG. 3, the reception unit 604 receives an ID of the object application included in the received execution request.

The distribution unit 605 distributes, on the basis of a specification result specified for each application #i, the cache memory CM (refer to FIG. 4) to the applications #1 to #n so that the total number of cache hits of each application #i is maximized. Note that the applications #1 to #n are assumed to be a plurality of applications that shares the cache memory CM (refer to FIG. 4).

For example, in a case where designation of an object application is received, the applications #1 to #n become the object application and other applications currently being executed. Furthermore, in a case where any one of the applications being executed ends, the applications #1 to #n become the other applications currently being executed other than the ended application.

For example, the distribution unit 605 creates a graph representing a correspondence relationship between a cache capacity and the number of cache hits to be allocated to each application #i with reference to the analysis result DB 320. Note that a specific example of the graph representing the correspondence relationship between the cache capacity and the number of cache hits to be allocated to the application #i will be described later with reference to FIG. 11.

Next, by using the graph created for each application #i, the distribution unit 605 determines a division ratio of the cache memory CM for the applications #1 to #n so that the total number of cache hits of each application #i is maximized. Note that a determination example of the division ratio of the cache memory CM will be described later with reference to FIG. 11.

Then, the distribution unit 605 divides the cache memory CM according to the determined division ratio, and allocates the cache memory CM to each application #i. In more detailed description, for example, the distribution unit 605 divides the cache memory CM according to the determined division ratio, and allocates the cache memory CM to each core #i (refer to FIG. 4). Then, the distribution unit 605 allocates each application #i to each core #i.

With this configuration, the distribution unit 605 may distribute the cache memory CM to the applications #1 to #n according to the determined division ratio. Note that, as a method for dividing the cache memory and allocating the cache memory to an object core, for example, the technology of Khang T Nguyen, "Introduction to Cache Allocation Technology", [online], Feb. 11, 2016, [Retrieved on Nov. 2, 2021], the Internet <URL:https://www.intel.com/content/www/us/en/developer/articles/technical/int roduction-to-cache-allocation-technology.html> described above may be used. Furthermore, as a method for allocating an object application to an object core, for example, a taskset command of Linux (registered trademark) may be used.

The processing of the acquisition unit 601, the calculation unit 602, and the specification unit 603 among the functional units (acquisition unit 601 to distribution unit 605) of the cache division device 301 described above may be executed, for example, before operation of the applications #1 to #n is started. Note that starting operation of the application #i means starting execution of the application #i in response to an execution request from a user.

With this configuration, information for distributing the cache memory CM to the applications #1 to #n may be obtained in advance before the operation of the applications #1 to #n is started.

Furthermore, the cache division device 301 may include a plurality of the CPUs 401 (CPUs #1 to #n). In this case, for example, the distribution unit 605 divides the cache memory CM according to the determined division ratio, and allocates the cache memory CM to each CPU #i. Then, the distribution unit 605 may allocate each application #i to each CPU #i.

Furthermore, the functional units (acquisition unit 601 to distribution unit 605) of the cache division device 301 described above may be implemented by a plurality of computers (for example, the cache division device 301 and the client device 302) in the information processing system 300.

(Operation Example of Trace Program tr)

Next, an operation example of the trace program tr will be described with reference to FIG. 8.

FIG. 8 is an explanatory diagram illustrating the operation example of the trace program tr. In FIG. 8, the trace program tr is a program that operates on an OS 801 of the cache division device 301, and acquires a trace of access to the memory 402.

For example, the trace program tr records, as a trace result 810, a virtual address of the memory 402 accessed at a layer of the OS 801 when the application #i is operated. The trace result 810 is stored in, for example, storage 802. The storage 802 is implemented by, for example, the disk 404 illustrated in FIG. 4. The trace result 810 corresponds to, for example, the memory access information 700 illustrated in FIG. 7.

(Calculation Example of Rd)

Next, a calculation example of rd will be described with reference to FIG. 9.

Figure 9:
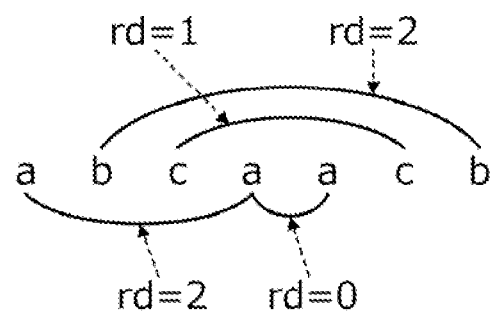
FIG. 9 is an explanatory diagram illustrating a calculation example of rd.

FIG. 9 is an explanatory diagram illustrating the calculation example of rd. In FIG. 9, "a, b, c, a, a, c, b" is obtained by extracting and arranging, in time series, a part of memory addresses specified from the memory access information 700 illustrated in FIG. 7 and accessed when the application #1 is operated. Here, a case where rd is calculated from "a, b, c, a, a, c, b" will be described.

For the application #1, the calculation unit 602 calculates rd for all memory addresses for which the same memory addresses are later accessed, with reference to "a, b, c, a, a, c, b". For example, after a in the first position, there is a in the fourth position. In this case, the calculation unit 602 calculates the number "2" of other memory addresses b and c accessed before access from a in the first position to a in the fourth position occurs as rd (rd=2).

Furthermore, after b in the second position, there is b in the seventh position. In this case, the calculation unit 602 calculates the number "2" of other memory addresses c and a accessed before access from b in the second position to b in the seventh position occurs as rd (rd=2). Furthermore, after c in the third position, there is c in the sixth position. In this case, the calculation unit 602 calculates the number "1" of another memory address a accessed before access from c in the third position to c in the sixth position occurs as rd (rd=1).

Furthermore, after a in the fourth position, there is a in the fifth position. In this case, since the calculation unit 602 continuously accesses a in the fourth position and a in the fifth position, and access to another memory address has not occurred, the calculation unit 602 sets rd to "0" (rd=0). After the fifth position, since there is no access to the same memory address later, rd is not calculated.

As a result, "rd=0" is calculated once, "rd=1" is calculated once, and "rd=2" is calculated twice.

(Specific Example of Histogram)

Next, a specific example of a histogram representing a frequency distribution of rd will be described with reference to FIG. 10. Here, it is assumed that the applications #1 to #n are "applications #1 to #3".

Figure 10:
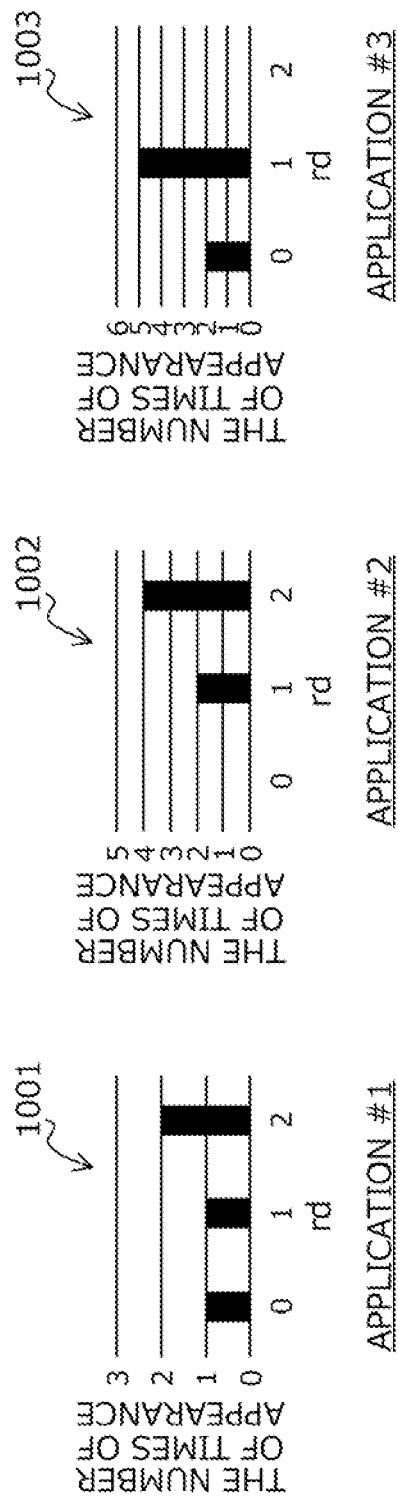
FIG. 10 is an explanatory diagram illustrating a specific example of a histogram.

FIG. 10 is an explanatory diagram illustrating the specific example of the histogram. In FIG. 10, histograms 1001 to 1003 are histograms representing a frequency distribution of rd for the applications #1 to #3. The histogram 1001 corresponds to a calculation result of rd of the application #1 (refer to FIG. 9), and the number of times of appearance of "rd=0" is 1, the number of times of appearance of "rd=1" is 1, and the number of times of appearance of "rd=2" is 2.

Furthermore, the histogram 1002 corresponds to a calculation result of rd of the application #2, and the number of times of appearance of "rd=0" is 0, the number of times of appearance of "rd=1" is 2, and the number of times of appearance of "rd=2" is 4. The histogram 1003 corresponds to a calculation result of rd of the application #3, and the number of times of appearance of "rd=0" is 2, the number of times of appearance of "rd=1" is 5, and the number of times of appearance of "rd=2" is 0.

(Specific Example of Graph)

Next, a specific example of a graph representing a correspondence relationship between a cache capacity and the number of cache hits to be allocated to the application #i will be described with reference to FIG. 11.

Figure 11:
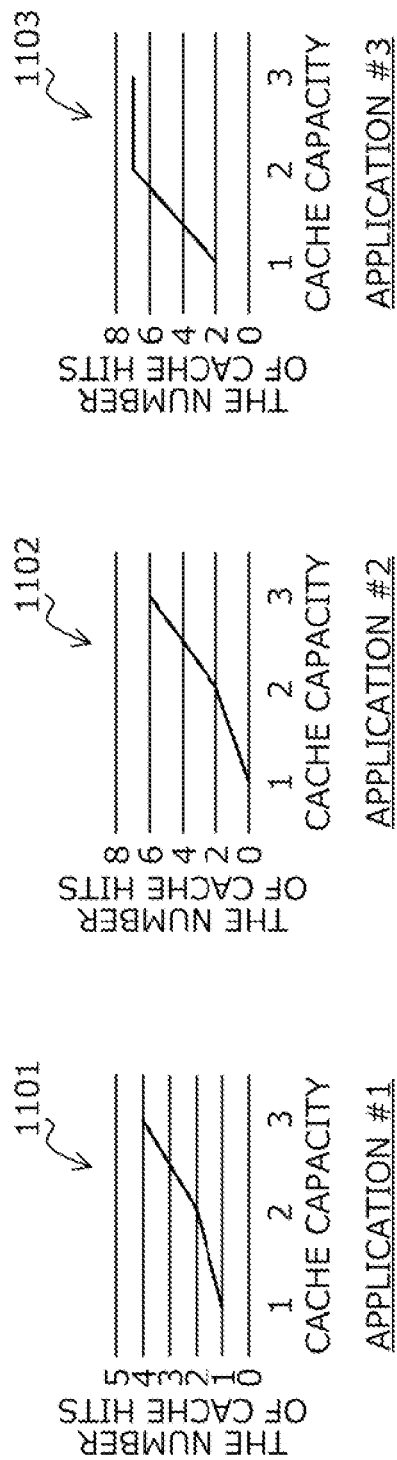
FIG. 11 is an explanatory diagram illustrating a specific example of a graph representing a correspondence relationship between the cache capacity and the number of cache hits.

FIG. 11 is an explanatory diagram illustrating the specific example of the graph representing the correspondence relationship between the cache capacity and the number of cache hits. In FIG. 11, graphs 1101 to 1103 represent a correspondence relationship between a cache capacity and the number of cache hits to be allocated for the applications #1 to #3, respectively.

The graph 1101 is obtained by, for example, integrating the histogram 1001 illustrated in FIG. 10. For example, according to the histogram 1001, it may be seen that, when the cache capacity of "1" may be prepared for the application #1, memory access whose rd is 0 becomes a cache hit. Furthermore, according to the histogram 1001, it may be seen that, when the cache capacity of "2" may be prepared for the application #1, memory access whose rd is equal to or less than 1 becomes a cache hit. Furthermore, according to the histogram 1001, it may be seen that, when the cache capacity of "3" may be prepared for the application #1, memory access whose rd is equal to or less than 2 becomes a cache hit.

Here, taking the application #1 as an example, a specification example of a correspondence relationship between a cache capacity and the number of cache hits to be allocated to the application #i will be described.

For example, by using Expression (1) described above, the specification unit 603 may specify the number of cache hits when each of cache capacities "m=1, 2, and 3" is allocated to the application #1. The number of cache hits corresponding to the cache capacity "m=1" is as indicated in the following Expression (2). The number of cache hits corresponding to the cache capacity "m=2" is as indicated in the following Expression (3). The number of cache hits corresponding to the cache capacity "m=3" is as indicated in the following Expression (4).

[Expression 2]

$$f(1) = \sum_{k=0}^{0} a_k = a_0 = 1 \qquad (2)$$

$$f(2) = \sum_{k=0}^{1} a_k = a_0 + a_1 = 1 + 1 = 2 \qquad (3)$$

$$f(3) = \sum_{k=0}^{2} a_k = a_0 + a_1 + a_2 = 1 + 1 + 2 = 4 \qquad (4)$$

According to Expressions (2) to (4) described above, it is possible to obtain a correspondence relationship between a cache capacity and the number of cache hits to be allocated to the application #1 indicated in the graph 1101. Similarly, the graphs 1102 and 1103 are obtained by, for example, integrating the histograms 1002 and 1003 illustrated in FIG. 10, respectively.

For example, by using the graphs 1101 to 1103, the distribution unit 605 determines a division ratio of the cache memory CM for the applications #1 to #3 so that the total number of cache hits of each of the applications #1 to #3 is maximized. Here, it is assumed that the total cache capacity of the cache memory CM is "3".

First, a case is assumed where the applications #1 and #2 are executed at the same time. In this case, when the cache memory CM is divided by "#1: #2=3:0", the total number of cache hits is "4" from the graphs 1101 and 1102. When the cache memory CM is divided by "#1: #2=2:1", the total number of cache hits is "2" from the graphs 1101 and 1102.

When the cache memory CM is divided by "#1: #2=1:2", the total number of cache hits is "3" from the graphs 1101 and 1102. When the cache memory CM is divided by "#1: #2=0:3", the total number of cache hits is "6" from the graphs 1101 and 1102.

From these facts, it may be seen that the number of cache hits is maximized when the entire cache capacity is allocated to the application #2. Thus, the distribution unit 605 determines the division ratio of the cache memory CM for the applications #1 and #2 to be "#1: #2=0:3".

Next, a case is assumed where the applications #1 and #3 are executed at the same time. In this case, the number of cache hits "8" when the cache memory CM is divided by "#1: #3=1:2" and allocated is the maximum. Thus, the distribution unit 605 determines the division ratio of the cache memory CM for the applications #1 and #3 to be "#1: #3=1:2".

Next, a case is assumed where the applications #2 and #3 are executed at the same time. In this case, the number of cache hits "7" when the cache memory CM is divided by "#2: #3=1:2" or "#2: #3=0:3" and allocated is the maximum. Thus, the distribution unit 605 determines the division ratio of the cache memory CM for the applications #2 and #3 to be "#2: #3=1:2" or "#2: #3=0:3".

Next, a case is assumed where the applications #1 to #3 are executed at the same time. In this case, the number of cache hits "8" when the cache memory CM is divided by "#1: #2: #3=1:0:2" and allocated is the maximum. Thus, the distribution unit 605 determines the division ratio of the cache memory CM for the applications #1 to #3 to be "#1: #2: #3=1:0:2".

Note that the problem of obtaining the division ratio that maximizes the number of cache hits as described above is called a knapsack problem, and it is difficult to always obtain an optimum solution. However, the distribution unit 605 may obtain an almost optimum solution by using, for example, an existing solution method such as a pseudo-polynomial time algorithm using dynamic programming or a fully polynomial time approximation scheme (FPTAS).

(Various Processing Procedures of Cache Division Device 301)

First, memory access characteristic analysis processing of the cache division device 301 will be described with reference to FIGS. 12 to 15. The memory access characteristic analysis processing is executed, for example, before start of operation of the applications #1 to #n.

Figure 12:
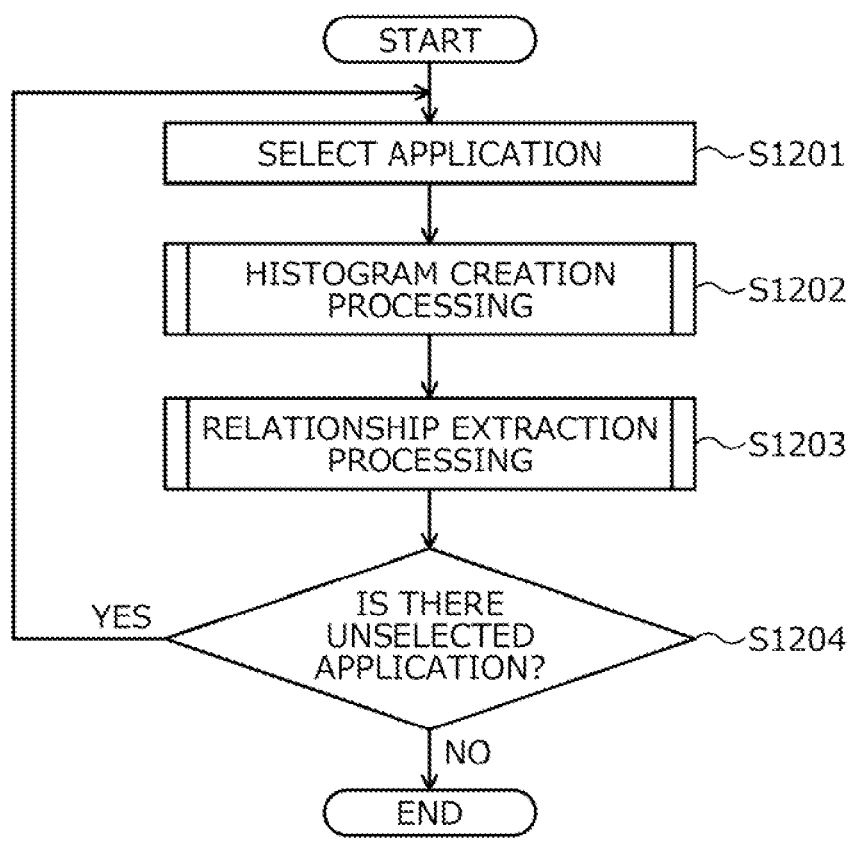
FIG. 12 is a flowchart illustrating an example of a memory access characteristic analysis processing procedure of the cache division device 301.

FIG. 12 is a flowchart illustrating an example of a memory access characteristic analysis processing procedure of the cache division device 301. In the flowchart of FIG. 12, first, the cache division device 301 selects an unselected application #i that is not selected among the applications #1 to #n (Step S1201). It is assumed that the applications #1 to #n are a plurality of applications that may share the cache memory CM.

Next, the cache division device 301 executes histogram creation processing for the selected application #i (Step S1202). The histogram creation processing is processing of creating a histogram representing a frequency distribution of rd. A specific processing procedure of the histogram creation processing will be described later with reference to FIGS. 13 and 14.

Next, the cache division device 301 executes relationship extraction processing for the selected application #i (Step S1203). The relationship extraction processing is processing of specifying a correspondence relationship between a cache capacity and the number of cache hits to be allocated to the application #i. A specific processing procedure of the relationship extraction processing will be described later with reference to FIG. 15.

Then, the cache division device 301 determines whether or not there is an unselected application that is not selected among the applications #1 to #n (Step S1204). Here, in a case where there is an unselected application (Step S1204: Yes), the cache division device 301 returns to Step S1201.

On the other hand, in a case where there is no unselected application (Step S1204: No), the cache division device 301 ends the series of processing according to this flowchart.

With this configuration, for each application #i of the applications #1 to #n that may share the cache memory CM, the cache division device 301 may specify the correspondence relationship between the cache capacity and the number of cache hits to be allocated to each application #i.

Next, a specific processing procedure of the histogram creation processing in Step S1202 indicated in FIG. 12 will be described with reference to FIGS. 13 and 14.

Figure 13:
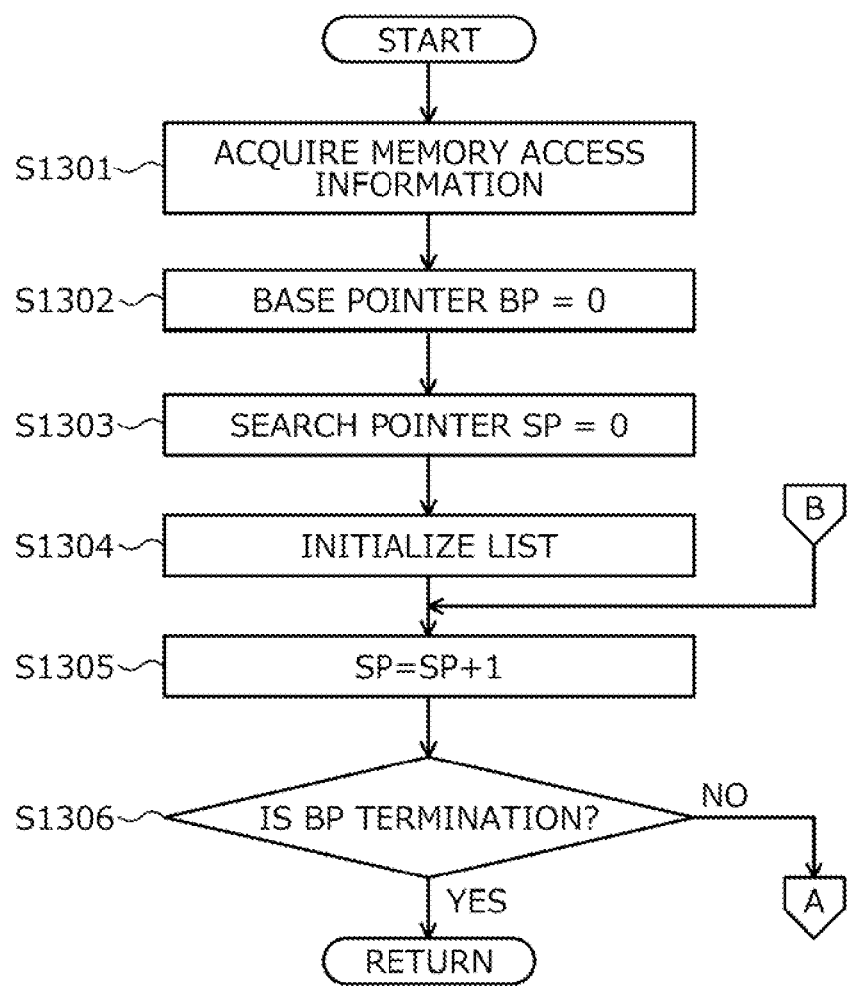
FIG. 13 is a flowchart (part 1) illustrating an example of a specific processing procedure of histogram creation processing.
Figure 14:
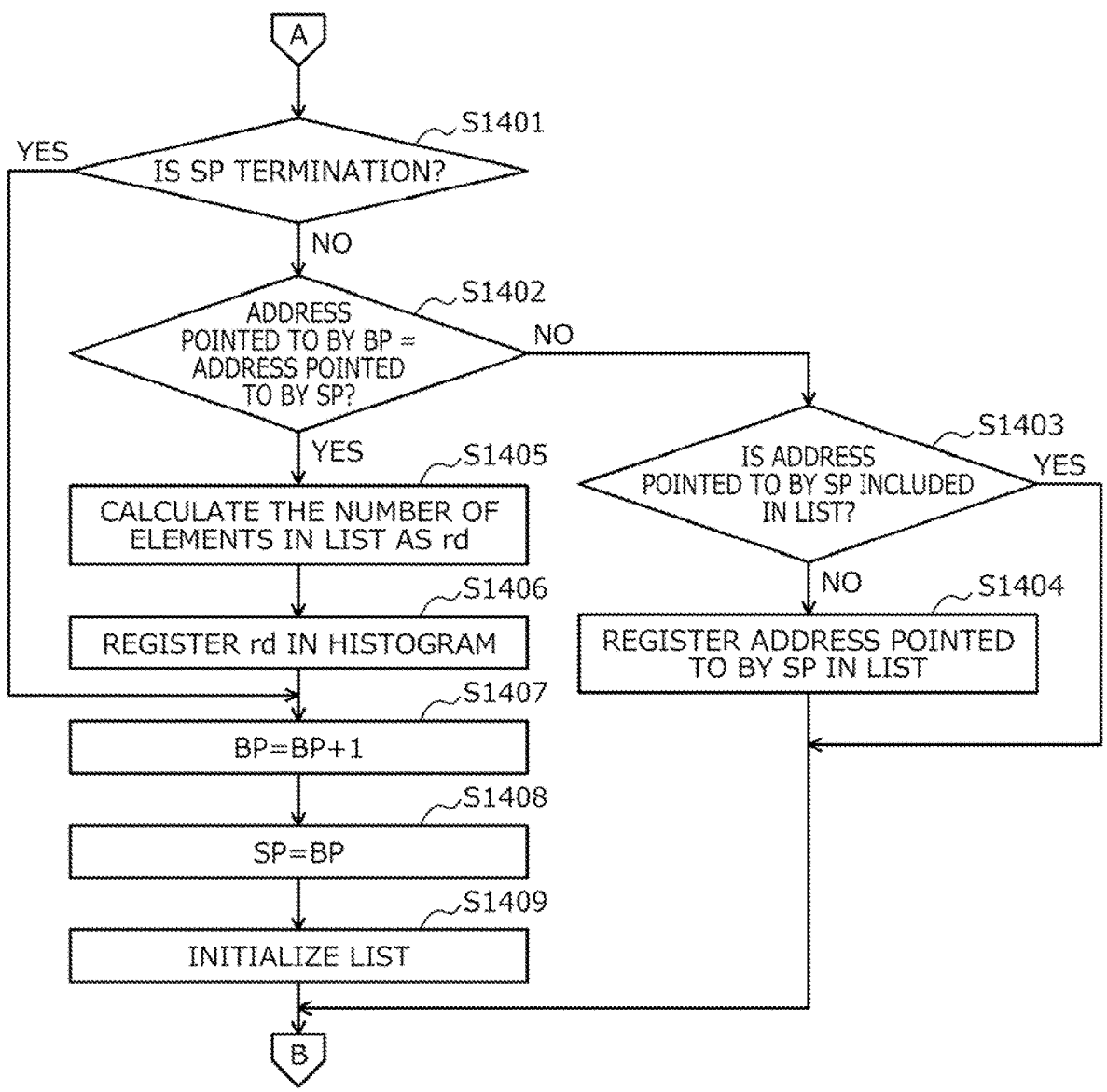
FIG. 14 is a flowchart (part 2) illustrating the example of the specific processing procedure of the histogram creation processing.

FIGS. 13 and 14 are flowcharts illustrating an example of the specific processing procedure of the histogram creation processing. In the flowchart of FIG. 13, first, memory access information of the application #i is acquired (Step S1301). Next, the cache division device 301 sets a base pointer BP to "BP=0" (Step S1302) and a search pointer SP to "SP=0" (Step S1303).

Then, the cache division device 301 initializes a list LT (Step S1304). Note that the base pointer BP and the search pointer SP are pointers indicating memory addresses of interest among memory addresses in time series indicated by the memory access information. The list LT stores the memory addresses.

Next, the cache division device 301 increments the search pointer SP (Step S1305). Then, the cache division device 301 determines whether or not the base pointer BP is a termination (Step S1306). Note that the termination corresponds to the last memory address among the memory addresses in time series indicated by the memory access information.

Here, in a case where the base pointer BP is not the termination (Step S1306: No), the cache division device 301 proceeds to Step S1401 indicated in FIG. 14.

In the flowchart of FIG. 14, first, the cache division device 301 determines whether or not the search pointer SP is the termination (Step S1401). Here, in a case where the search pointer SP is the termination (Step S1401: Yes), the cache division device 301 proceeds to Step S1407.

On the other hand, in a case where the search pointer SP is not the termination (Step S1401: No), the cache division device 301 determines whether or not an address pointed to by the base pointer BP and an address pointed to by the search pointer SP are the same (Step S1402). Here, in a case where the addresses are not the same (Step S1402: No), the cache division device 301 determines whether or not the address pointed to by the search pointer SP is included in the list LT (Step S1403).

Here, in a case where the address is included in the list LT (Step S1403: Yes), the cache division device 301 returns to Step S1305 indicated in FIG. 13. On the other hand, in a case where the address is not included in the list LT (Step S1403: No), the cache division device 301 registers the address pointed to by the search pointer SP in the list LT (Step S1404), and returns to Step S1305 indicated in FIG. 13.

Furthermore, in a case where the address pointed to by the base pointer BP and the address pointed to by the search pointer SP are the same in Step S1402 (Step S1402: Yes), the cache division device 301 calculates the number of elements in the list LT as rd (Step S1405). Then, the cache division device 301 registers the calculated rd in a histogram (Step S1406).

Next, the cache division device 301 increments the base pointer BP (Step S1407), and assigns the base pointer BP to the search pointer SP (Step S1408). Then, the cache division device 301 initializes the list LT (Step S1409), and returns to Step S1305 indicated in FIG. 13.

Furthermore, in a case where the base pointer BP is the termination in Step S1306 indicated in FIG. 13 (Step S1306: Yes), the cache division device 301 returns to the step in which the histogram creation processing is called. With this configuration, the cache division device 301 may create the histogram representing the frequency distribution of rd for the application #i.

Next, a specific processing procedure of the relationship extraction processing in Step S1203 indicated in FIG. 12 will be described with reference to FIG. 15.

Figure 15:
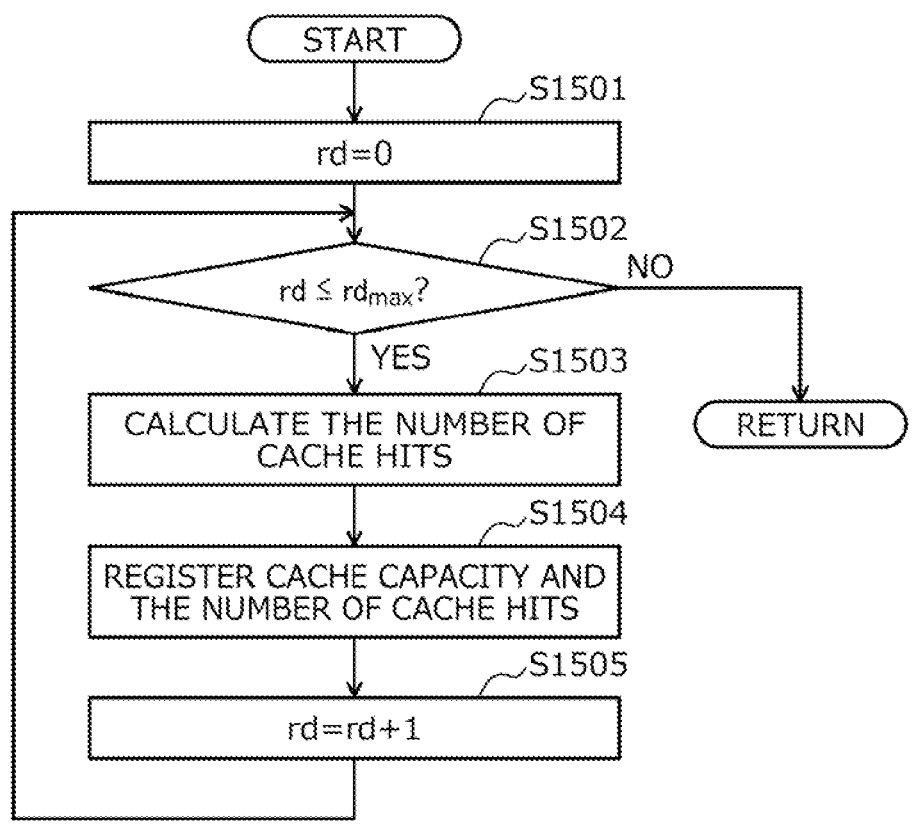
FIG. 15 is a flowchart illustrating an example of a specific processing procedure of relationship extraction processing.

FIG. 15 is a flowchart illustrating an example of the specific processing procedure of the relationship extraction processing. In the flowchart of FIG. 15, first, the cache division device 301 sets rd to "rd=0" (Step S1501), and determines whether or not rd is equal to or less than $rd_{max}$ with reference to the histogram created in Step S1202 (Step S1502).

Here, in a case where rd is equal to or less than $rd_{max}$ (Step S1502: Yes), the cache division device 301 calculates the number of cache hits f(m) in the case of the cache capacity m (m=rd+1) with reference to the created histogram and using Expression (1) described above (Step S1503).

Then, the cache division device 301 registers the cache capacity m and the number of cache hits f(m) in the analysis result DB 320 in association with an ID of the application #i (Step S1504). Next, the cache division device 301 increments rd (Step S1505), and returns to Step S1502.

Furthermore, in a case where rd is larger than $rd_{max}$ in Step S1502 (Step S1502: No), the cache division device 301 returns to the step in which the relationship extraction processing is called. With this configuration, the cache division device 301 may specify the correspondence relationship between the cache capacity and the number of cache hits to be allocated to the application #i.

Figure 16:
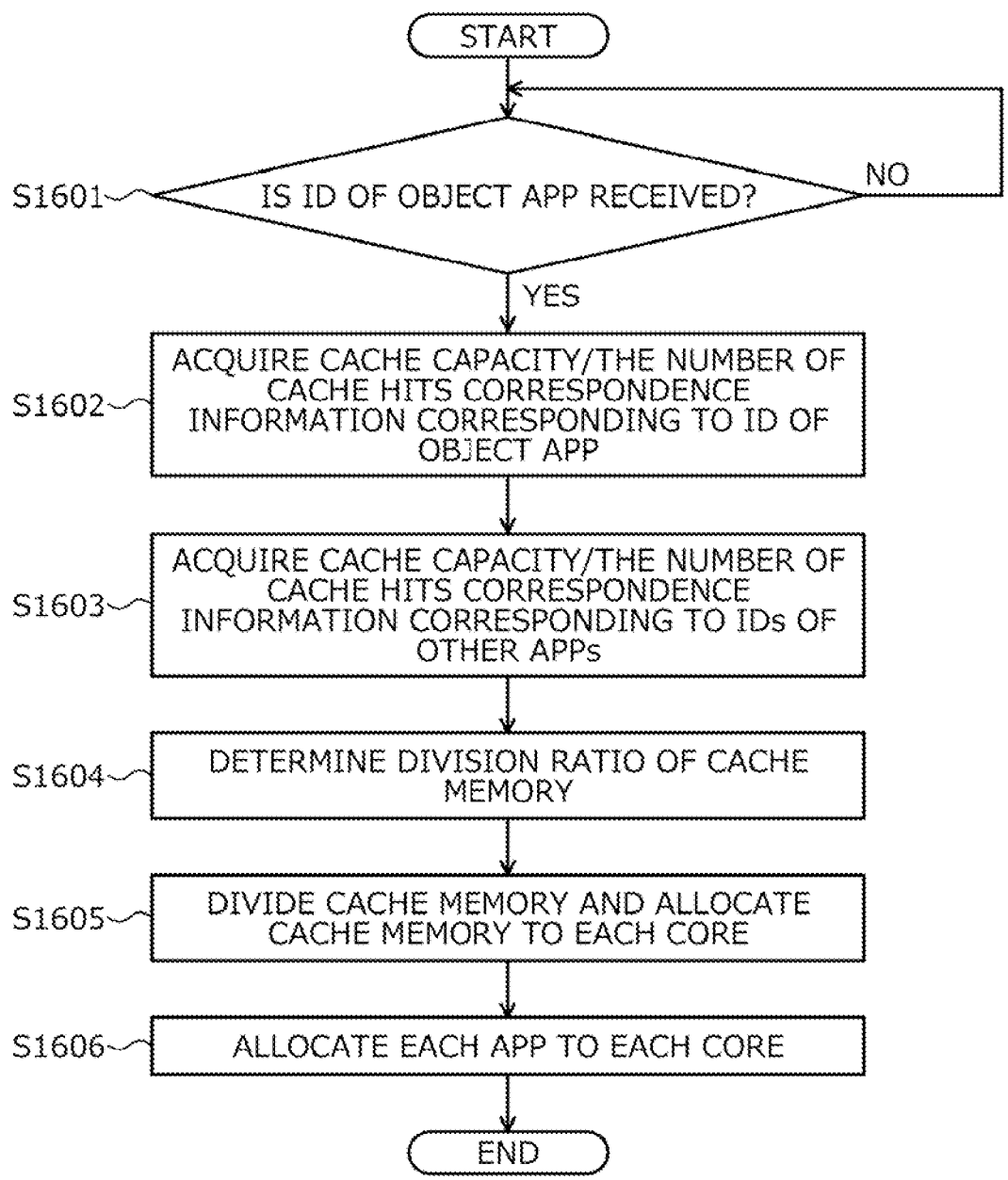
FIG. 16 is a flowchart illustrating an example of a first cache division processing procedure of the cache division device 301.

Next, a first cache division processing procedure of the cache division device 301 will be described with reference to FIG. 16. In FIG. 16, an application is referred to as "app".

FIG. 16 is a flowchart illustrating an example of the first cache division processing procedure of the cache division device 301. In the flowchart of FIG. 16, first, the cache division device 301 determines whether or not an ID of an object application is received (Step S1601). Here, the cache division device 301 stands by for reception of the ID of the object application (Step S1601: No).

Then, in a case where the ID of the object application is received (Step S1601: Yes), the cache division device 301 acquires cache capacity/the number of cache hits correspondence information corresponding to the ID of the object application from the analysis result DB 320 (Step S1602). Next, the cache division device 301 acquires cache capacity/the number of cache hits correspondence information corresponding to IDs of other applications being executed from the analysis result DB 320 (Step S1603).

Then, on the basis of the acquired cache capacity/the number of cache hits correspondence information of each application #i, the cache division device 301 determines a division ratio of the cache memory CM for the applications #1 to #n so that the total number of cache hits of each application #i is maximized (Step S1604). The applications #1 to #n are the object application and the other applications currently being executed.

Next, the cache division device 301 divides the cache memory CM according to the determined division ratio, and allocates the cache memory CM to each core #i (Step S1605). Then, the cache division device 301 allocates each application #i to each core #i (Step S1606), and ends the series of processing according to this flowchart.

With this configuration, the cache division device 301 may appropriately divide the cache memory CM and allocate the cache memory CM to each application when executing a new application. Note that, when there is no other application being executed in Step S1603, the cache division device 301 allocates the cache memory CM to the object application without dividing the cache memory CM, for example.

Figure 17:
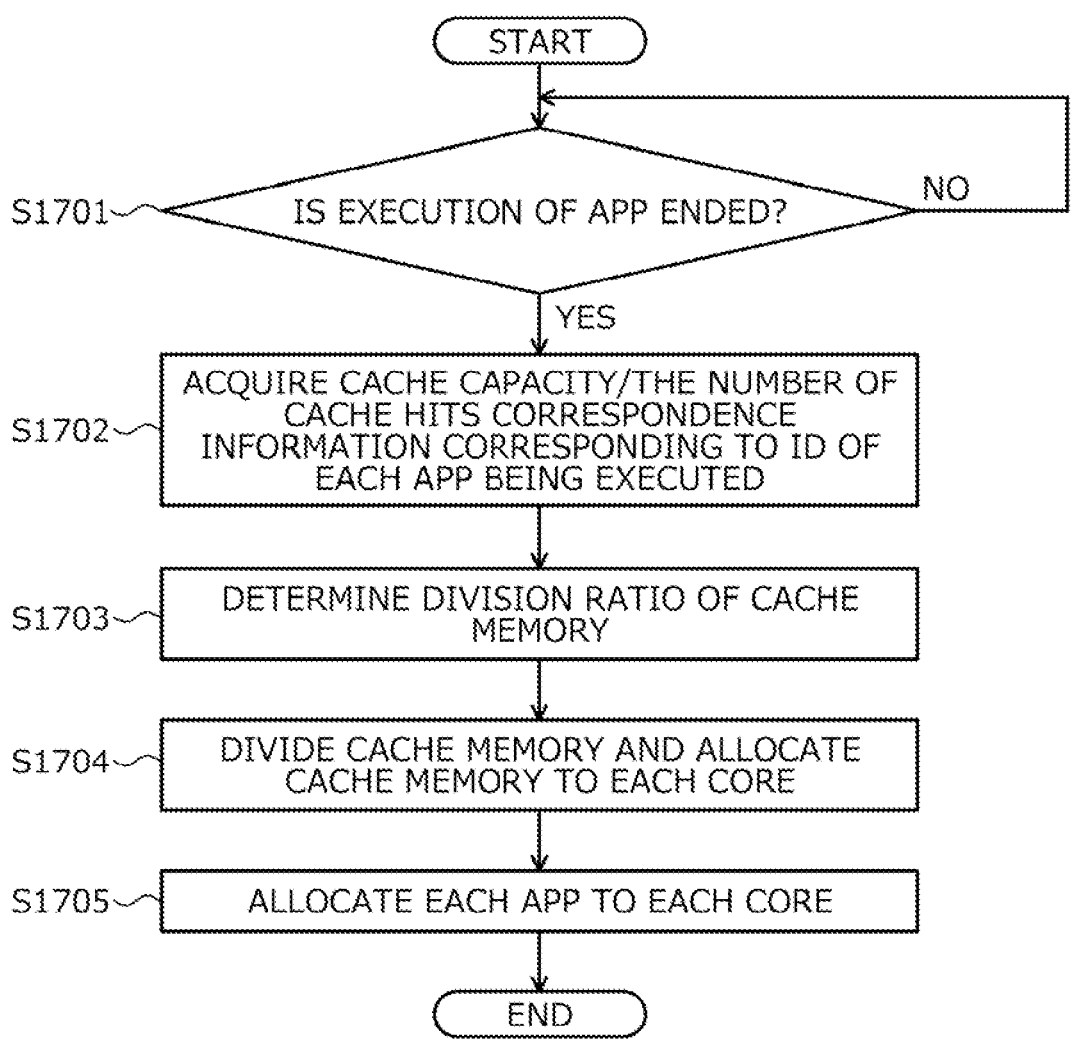
FIG. 17 is a flowchart illustrating an example of a second cache division processing procedure of the cache division device 301.

Next, a second cache division processing procedure of the cache division device 301 will be described with reference to FIG. 17. In FIG. 17, an application is referred to as "app".

FIG. 17 is a flowchart illustrating an example of the second cache division processing procedure of the cache division device 301. In the flowchart of FIG. 17, first, the cache division device 301 determines whether or not execution of an application is ended (Step S1701). Here, the cache division device 301 stands by for end of the execution of the application (Step S1701: No).

Then, in a case where the execution of the application is ended (Step S1701: Yes), the cache division device 301 acquires cache capacity/the number of cache hits correspondence information corresponding to an ID of each application #i currently being executed from the analysis result DB 320 (Step S1702).

Then, on the basis of the acquired cache capacity/the number of cache hits correspondence information of each application #i, the cache division device 301 determines a division ratio of the cache memory CM for the applications #1 to #n so that the total number of cache hits of each application #i is maximized (Step S1703). The applications #1 to #n are applications currently being executed.

Next, the cache division device 301 divides the cache memory CM according to the determined division ratio, and allocates the cache memory CM to each core #i (Step S1704). Then, the cache division device 301 allocates each application #i to each core #i (Step S1705), and ends the series of processing according to this flowchart.

With this configuration, when any one of applications being executed ends, the cache division device 301 may appropriately divide the cache memory CM and allocate the cache memory CM to each of remaining applications. Note that, when there is only one remaining application in Step S1702, the cache division device 301 allocates the cache memory CM to the application without dividing the cache memory CM, for example. Furthermore, in a case where there is no remaining application, the cache division device 301 does not allocate the cache memory CM.

First Example

Next, a first example of the cache division device 301 will be described with reference to FIG. 18. Here, description will be made by taking, as an example, a case where the functional units (acquisition unit 601 to distribution unit 605) of the cache division device 301 are implemented by an orchestrator 1801 operating on the OS 801.

Figure 18:
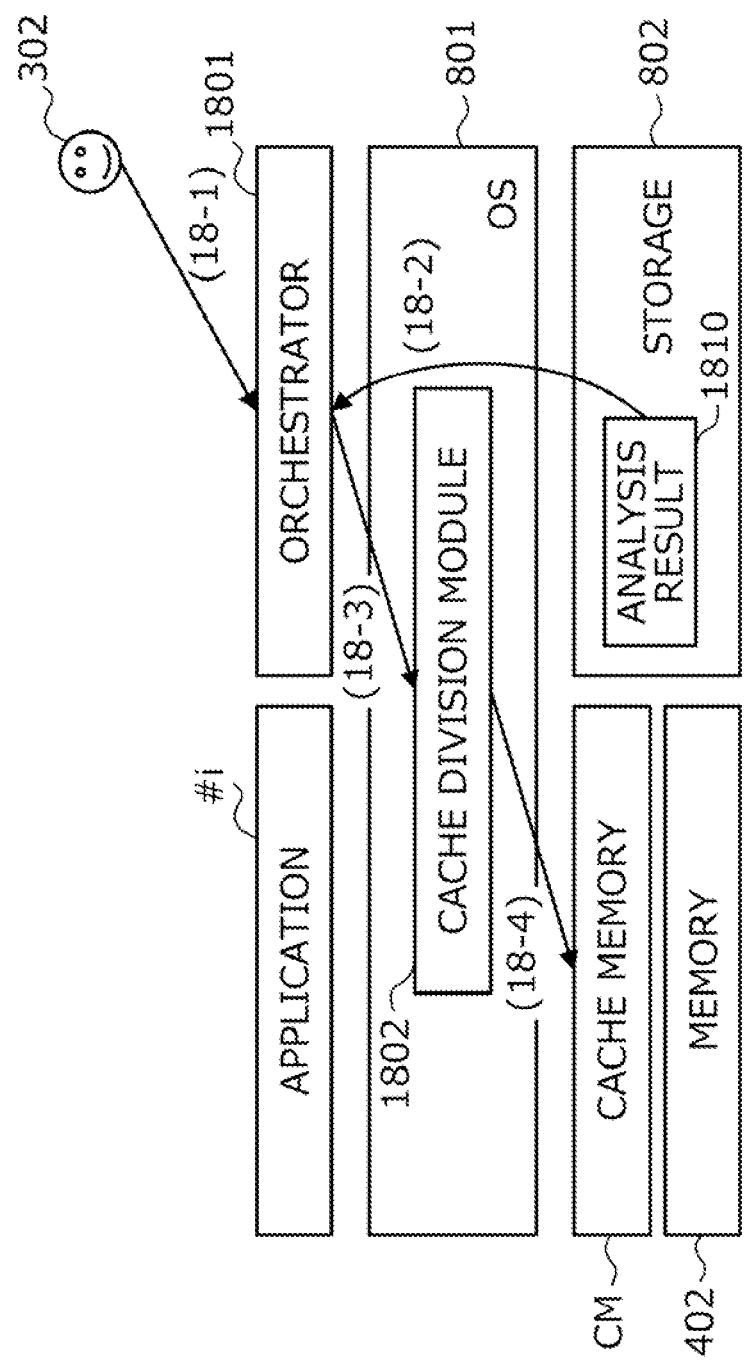
FIG. 18 is an explanatory diagram illustrating an operation example of the cache division device 301.

FIG. 18 is an explanatory diagram illustrating an operation example of the cache division device 301. In FIG. 18, the orchestrator 1801 is software that operates on the OS 801, and performs settings, management, adjustment, and the like of a computer system. Hereinafter, an operation example of the cache division device 301 when execution of an object application is started will be described.

(18-1) The orchestrator 1801 receives an execution request of an object application from the client device 302.

(18-2) When receiving the execution request of the object application, the orchestrator 1801 acquires an analysis result 1810 from the storage 802. The analysis result 1810 corresponds to, for example, the cache capacity/the number of cache hits correspondence information 500-1 to 500-$n$ for the applications #1 to #n in the analysis result DB 320 (for example, refer to FIG. 5). Then, on the basis of the acquired analysis result 1810, the orchestrator 1801 determines a division ratio of the cache memory CM for the applications #1 to #n so that the total number of cache hits of each application #i is maximized.

(18-3) The orchestrator 1801 transmits a division request to a cache division module 1802. Here, the division request requests the cache division module 1802 to divide the cache memory CM according to the determined division ratio.

(18-4) In response to the division request from the orchestrator 1801, the cache division module 1802 divides the cache memory CM according to the determined division ratio. Then, the orchestrator 1801 allocates the divided cache memory CM to each core #i (refer to FIG. 4), and allocates each application #i to each core #i.

With this configuration, the cache memory CM may be divided and allocated to each of the applications #1 to #n so that the total number of cache hits of each application #i is maximized, and use efficiency of the cache memory CM may be improved.

Second Example

In the description described above, the description has been made by taking, as an example, the case where the memory access pattern of each application #i is analyzed offline (before starting the operation of the applications #1 to #n), and the cache memory CM is divided online (when operating the applications #1 to #n).

In view of the current hardware performance, it is preferable to perform the analysis of the memory access pattern offline. However, the analysis of the memory access pattern may also be performed online when the hardware advances in the future and remarkable improvement in performance may be achieved.

Here, a case where the analysis of the memory access pattern is performed online will be described. In the first example, a memory access pattern of each application is analyzed offline before actual execution of an application, and a correspondence relationship between a cache capacity and the number of cache hits is specified. In a second example, an execution request of an application may be made to the orchestrator 1801 without performing offline processing.

When receiving an execution request of an object application from the client device 302, the orchestrator 1801 divides the cache memory CM by a predetermined distribution (for example, divides evenly between applications being executed), and starts execution of each application #i. After starting the execution, the orchestrator 1801 acquires a trace (memory access information) of memory access of each application #i over a certain period of time (for example, 1 minute).

After the lapse of the certain period of time, the orchestrator 1801 creates a histogram of rd of each application #i by using the acquired trace. For each application #i, the orchestrator 1801 graphs a correspondence relationship between a cache capacity and the number of cache hits by integrating the created histogram.

The orchestrator 1801 matches graphs of all the applications #1 to #n being executed at that time, and determines a division ratio of the cache memory CM for the applications #1 to #n so that the total number of cache hits of each application #i is maximized.

Then, the orchestrator 1801 notifies the cache division module 1802 of the determined division ratio, and divides the cache memory CM. For example, by reacquiring the trace every certain period of time and repeating the processing, the orchestrator 1801 may improve use efficiency of the cache memory CM without analyzing the memory access pattern offline in advance.

As described above, according to the cache division device 301 according to the embodiment, it is possible to acquire memory access information for each application #i of the applications #1 to #n, and calculate, on the basis of the acquired memory access information, a frequency distribution of access intervals to the same memory address. Furthermore, according to the cache division device 301, it is possible to specify, for each application #i, a correspondence relationship between a cache capacity and the number of cache hits to be allocated to each application #i on the basis of the calculated frequency distribution of the access intervals. Then, according to the cache division device 301, it is possible to distribute, on the basis of the correspondence relationship specified for each application #i, the cache memory CM to the applications #1 to #n so that the total number of cache hits of each application #i is maximized.

With this configuration, the cache division device 301 may distribute the cache memory CM to the applications #1 to #n according to a memory access pattern of each application #i, and may improve use efficiency of the cache memory CM. For example, in consideration of an interval at which each application #i accesses the same memory area and a frequency of occurrence of the access interval, the information processing apparatus 101 may distribute the cache memory CM to the applications #1 to #n so as to maximize the number of cache hits of the entire applications #1 to #n.

Furthermore, according to the cache division device 301, it is possible to execute, for each application #i, the processing of acquiring the memory access information, the processing of calculating the frequency distribution of the access intervals to the same memory address, and the processing of specifying the correspondence relationship between the cache capacity and the number of cache hits to be allocated, before the operation of the applications #1 to #n is started.

With this configuration, the cache division device 301 may analyze characteristics (memory access pattern) of a cache access interval of each application #i in advance by using the access intervals to the same memory address of each application #i. Thus, it is not needed to perform capturing of cache access in real time and analysis of an access pattern, and it is possible to appropriately distribute the cache memory CM without implementing dedicated hardware. Furthermore, since it is not needed to perform the analysis of the access pattern in real time, a problem of an amount of calculation and a problem of an amount of data may be relieved, and it is possible to perform division of the cache memory CM even in a case where the number of applicable cores is large.

Furthermore, according to the cache division device 301, it is possible to determine, on the basis of the correspondence relationship specified for each application #i, a division ratio of the cache memory CM for the applications #1 to #n so that the total number of cache hits of each application #i is maximized. Then, according to the cache division device 301, it is possible to divide the cache memory CM according to the determined division ratio, and allocate the cache memory CM to each application #i.

With this configuration, the cache division device 301 may divide the cache memory CM and allocate the cache memory CM to each application #i so that the total number of cache hits of each application #i is maximized.

Furthermore, according to the cache division device 301, for each application #i, it is possible to calculate, on the basis of the memory access information, the number of other memory addresses accessed before access to the same memory address occurs as the access intervals to the same memory address, and calculate a frequency distribution of the calculated access intervals.

With this configuration, the cache division device 301 may analyze the memory access pattern of each application #i by using a reuse distance (rd).

Furthermore, according to the cache division device 301, it is possible to create, for each application #i, a histogram representing the calculated frequency distribution of the access intervals, and specify a correspondence relationship between a cache capacity and the number of cache hits to be allocated to each application #i by integrating the created histogram.

With this configuration, the cache division device 301 may specify the number of cache hits according to the cache capacity to be allocated to each application #i.

From these facts, according to the cache division device 301, it is possible to dynamically divide the cache memory CM and allocate the cache memory CM to each application #i so that the total number of cache hits of the applications #1 to #n being executed is increased. For example, the cache division device 301 may match graphs representing the correspondence relationship between the cache capacity and the number of cache hits between the applications when the applications are executed, and divide a cache size so that the total number of cache hits is maximized. With this configuration, it is possible to enhance use efficiency of the cache memory CM, and improve performance of the system.

Note that the division method described in the present embodiment may be implemented by executing a program prepared in advance on a computer such as a personal computer or a workstation. The present division program is recorded on a computer-readable recording medium such as a hard disk, a flexible disk, a CD-ROM, a DVD, or a USB memory, and is read from the recording medium to be executed by the computer. Furthermore, the present division program may be distributed via a network such as the Internet.

Furthermore, the information processing apparatus 101 (cache division device 301) described in the present embodiment may also be implemented by a special-purpose integrated circuit (IC) such as a standard cell or a structured application specific integrated circuit (ASIC) or a programmable logic device (PLD) such as a field-programmable gate array (FPGA).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a division program for causing a computer to execute processing comprising:
    acquiring, for each application of a plurality of applications capable of sharing a cache memory, memory access information that enables specification of memory addresses accessed when each of the applications is operated in time series;
    calculating, for each of the applications, a frequency distribution in which frequencies of appearance of same values of an index value corresponding to a number of other memory addresses which are accessed before an access to a same memory address occurs are arranged based on the acquired memory access information;
    specifying, for each of the applications, a correspondence relationship between a cache capacity and a number of cache hits to be allocated to each of the applications on the basis of the calculated frequency distribution of the access intervals; and
    distributing, on the basis of the correspondence relationship specified for each of the applications, the cache memory to the plurality of applications such that a total number of cache hits of each of the applications is maximized.

2. The non-transitory computer-readable recording medium according to claim 1, wherein the processing of acquiring, the processing of calculating, and the processing of specifying are executed before operation of the plurality of applications is started.

3. The non-transitory computer-readable recording medium according to claim 1, wherein in the processing of distributing, on the basis of the correspondence relationship specified for each of the applications, a division ratio of the cache memory for the plurality of applications is determined such that the total number of cache hits of each of the applications is maximized, and the cache memory is divided and allocated to each of the applications according to the determined division ratio.

4. The non-transitory computer-readable recording medium according to claim 1, wherein in the processing of calculating, for each of the applications, on the basis of the memory access information, the number of other memory addresses accessed before access to the same memory address occurs is calculated as the access intervals to the same memory address, and a frequency distribution of the calculated access intervals is calculated.

5. The non-transitory computer-readable recording medium according to claim 1, wherein in the processing of specifying, for each of the applications, a histogram that represents the calculated frequency distribution of the access intervals is created, and a correspondence relationship between a cache capacity and the number of cache hits to be allocated to each of the applications is specified by integrating the created histogram.

6. A division method comprising:
    acquiring, for each application of a plurality of applications capable of sharing a cache memory, memory access information that enables specification of memory addresses accessed when each of the applications is operated in time series;
    calculating, for each of the applications, a frequency distribution in which frequencies of appearance of same values of an index value corresponding to a number of other memory addresses which are accessed before an access to a same memory address occurs are arranged based on the acquired memory access information;
    specifying, for each of the applications, a correspondence relationship between a cache capacity and a number of cache hits to be allocated to each of the applications on the basis of the calculated frequency distribution of the access intervals; and
    distributing, on the basis of the correspondence relationship specified for each of the applications, the cache memory to the plurality of applications such that a total number of cache hits of each of the applications is maximized.

* * * * *